(12) United States Patent
Barbera et al.

(10) Patent No.: US 10,498,838 B2
(45) Date of Patent: Dec. 3, 2019

(54) DETERMINING ONLINE SYSTEM USER ELIGIBILITY FOR RECEIVING CONTENT USING A POLYGON REPRESENTING A PHYSICAL LOCATION ASSOCIATED WITH THE CONTENT

(71) Applicant: Facebook, Inc., Menlo Park, CA (US)

(72) Inventors: Marco Valerio Barbera, London (GB); Kevin Ventullo, Cambridge, MA (US); Charles Joseph Hughes, San Francisco, CA (US); Yin Wang, Fremont, CA (US)

(73) Assignee: Facebook, Inc., Menlo Park, CA (US)

( * ) Notice: Subject to any disclaimer, the term of this patent is extended or adjusted under 35 U.S.C. 154(b) by 250 days.

(21) Appl. No.: 15/600,736

(22) Filed: May 21, 2017

(65) Prior Publication Data
US 2018/0338009 A1 Nov. 22, 2018

(51) Int. Cl.
*H04L 29/08* (2006.01)
*G06Q 50/00* (2012.01)
*H04W 4/02* (2018.01)

(52) U.S. Cl.
CPC ............ *H04L 67/18* (2013.01); *G06Q 50/01* (2013.01); *H04L 67/20* (2013.01); *H04L 67/306* (2013.01); *H04W 4/02* (2013.01)

(58) Field of Classification Search
CPC ......... G06Q 50/01; H04L 67/18; H04L 67/20; H04L 67/306; H04W 4/02
See application file for complete search history.

(56) References Cited

U.S. PATENT DOCUMENTS

| | | | | |
|---|---|---|---|---|
| 2007/0015489 | A1* | 1/2007 | Jennings | H04W 4/02 455/404.2 |
| 2009/0011777 | A1* | 1/2009 | Grunebach | H04W 4/02 455/456.3 |
| 2012/0225672 | A1* | 9/2012 | Tholkes | H04W 4/021 455/456.3 |

* cited by examiner

*Primary Examiner* — Jaime M Holliday
(74) *Attorney, Agent, or Firm* — Fenwick & West LLP

(57) ABSTRACT

An online system determines a polygon representing a physical location associated with a content item and indexes edges of the polygon based on their positions along an axis of a map. The index is used to retrieve edges spanning a point on the axis representing a location of a client device associated with an online system user. The online system compares the positions of the point and retrieved edges on an axis perpendicular to the axis and determines whether the user is at the physical location based on the comparison. If the user is not at the physical location, a boundary surrounding the point is compared with boundaries surrounding the indexed edges to determine whether the user is within a threshold distance of the physical location. If the user is at or within the threshold distance of the physical location, the user is determined eligible to receive the content item.

23 Claims, 9 Drawing Sheets

37.7982° N, 122.4074° W 37.7982° N, 122.4074° W

Polygon ID: USCASFSR_92026

| Street Address: 325 Columbus Ave, San Francisco, CA 94133 Geographic Coordinates: 37.7982° N, 122.4074° W | | | |
|---|---|---|---|
| Edge | Endpoint 1 Latitude | Endpoint 2 Latitude | Edge Boundary (vertices) |
| a | 37.798252°N | 37.797982°N | 37.798252°N, 122.407695°W; 37.798252°N, 122.407639°W; 37.797982°N, 122.407639°W; 37.797982°N, 122.407695°W |
| b | 37.798273°N | 37.798252°N | 37.798273°N, 122.407501°W; 37.798273°N, 122.407695°W; 37.798252°N, 122.407695°W; 37.798252°N, 122.407501°W |
| c | 37.798273°N | 37.798199°N | 37.798273°N, 122.407501°W; 37.798273°N, 122.407395°W; 37.798199°N, 122.407395°W; 37.798199°N, 122.407501°W |
| d | 37.798199°N | 37.798156°N | 37.798199°N, 122.407395°W; 37.798199°N, 122.407422°W; 37.798156°N, 122.407422°W; 37.798156°N, 122.407395°W |
| e | 37.798156°N | 37.798036°N | 37.798156°N, 122.407422°W; 37.798156°N, 122.40739°W; 37.798036°N, 122.40739°W; 37.798036°N, 122.407422°W |
| f | 37.798036°N | 37.798015°N | 37.798036°N, 122.40739°W; 37.798036°N, 122.407404°W; 37.798015°N, 122.407404°W; 37.798015°N, 122.40739°W |
| g | 37.798015°N | 37.797982°N | 37.798015°N, 122.407404°W; 37.798015°N, 122.407639°W; 37.797982°N, 122.407639°W; 37.797982°N, 122.407404°W |

DETERMINING ONLINE SYSTEM USER ELIGIBILITY FOR RECEIVING CONTENT USING A POLYGON REPRESENTING A PHYSICAL LOCATION ASSOCIATED WITH THE CONTENT

BACKGROUND

This disclosure relates generally to online systems, and more specifically to presenting content to users of an online system.

Online systems, such as social networking systems, allow online system users to connect to and to communicate with other online system users. Users may create profiles on an online system that are tied to their identities and include information about the users, such as interests and demographic information. The users may be individuals or entities such as corporations or charities. Online systems allow users to easily communicate and to share content with other users by providing content items to an online system for presentation to the other users. Content items provided to an online system by a user may include declarative information about the user, status updates, check-ins to locations, images, photographs, videos, text data, or any other information the user wishes to share with additional users of the online system. An online system may also generate content items for presentation to a user, such as content items describing actions taken by other users on the online system.

Many online systems allow users (e.g., businesses) to sponsor presentation of content on an online system to gain public attention for a user's products or services or to persuade other users to take an action regarding the user's products or services. Content for which an online system receives compensation in exchange for presenting to users is referred to as "sponsored content." Additionally, many online systems receive compensation from a user for presenting online system users with certain types of sponsored content provided by the user. Frequently, online systems charge a user for each presentation of a sponsored content item to an online system user or for each interaction with a sponsored content item by an online system user. For example, an online system receives compensation from an entity each time a content item provided by the user is displayed to another user on the online system or each time another user is presented with a content item on the online system and interacts with the content item (e.g., selects a link included in the content item), or each time another user performs another action after being presented with the content item (e.g., visits a physical location associated with the user who provided the content item).

Online systems often apply criteria associated with content items upon identifying an opportunity to present content to a user of an online system to identify online system users who are most likely to be interested in being presented with the content items. Such "targeting" criteria are often specified to an online system by a user that submits a content item to the online system for presentation to other users. Targeting criteria allow the online system to identify users eligible to be presented with a content item based on characteristics associated with the users. For example, content items associated with a particular restaurant may be associated with targeting criteria describing users who have indicated an interest in the restaurant by frequently checking in to the same or a similar restaurant via the online system, users whose profile information on the online system includes dining out as an interest or hobby, and users who have indicated a preference for a page about the restaurant on the online system. Hence, targeting criteria allow an online system to identify users who are most likely to be interested in being presented with a particular content item as eligible to receive the content item.

Some content items presented by an online system are naturally more relevant to certain users than to other users based on physical locations associated with the content items and the users. For example, content items describing a museum having a physical location in a particular city are more likely to be relevant to users who are visiting the physical location or an area near the physical location than to users who are in a distant area of the city or who are in a different city. As such, targeting criteria associated with content items provided to an online system often include information describing physical locations associated with the content items and a distance relative to the physical locations for identifying users eligible to be presented with the content items by the online system. For example, targeting criteria associated with content items describing the museum of the previous example may specify online system users determined to have a current or recent physical location at or within a specified distance of the museum are eligible to receive the content items. An online system may apply such targeting criteria by determining a location of a client device associated with an online system user and comparing the location of the client device with a physical location associated with a content item. If the client device is determined to be at or within a specified distance from the physical location described by targeting criteria, the online system may determine the user is eligible to receive the content item and present the user with the content item.

However, online systems that apply targeting criteria describing physical locations associated with content items are often required to perform complex, resource-intensive operations on large amounts of data in short periods of time to extract, analyze and process information necessary to determine locations of users relative to the physical locations. These operations must be performed in addition to operations required to identify content items likely to be of interest to a user based on the user's determined location when the online system identifies an opportunity to present content to the user. For example, an online system must receive information describing a geographic location of a client device associated with a user and quickly and accurately analyze the user's location relative to various physical locations associated with various content items to determine whether the user is at or within a threshold distance of any particular physical location. If the user is determined to be at or within a threshold distance of a physical location associated with a content item, the online system must then identify the content item as a candidate content item eligible to be provided to the user based on the user's location. The candidate content item may then be included in a content selection process which requires additional processing time in order to select content items that will be presented to the user.

Failure to perform these operations in a quick and efficient manner may result in user dissatisfaction and alienation. For example, a user may be within a threshold distance of several physical locations associated with various content items for only a short period of time as the user travels through a neighborhood including the physical locations. If the user is not within a threshold distance of a particular physical location associated with a content item when a request for content from the user is received but is at the physical location when the operations are completed, the online system may determine the user is not eligible to receive the content item despite the user's likely interest in the content item. Similarly, the time required to perform the operations may cause an online system to determine a user is eligible to be presented with a content item only after the user is far from a physical location associated with the content item and therefore likely to be less interested in the content item. Hence, conventional application of targeting criteria describing physical locations associated with content items may cause an online system to determine users who would likely be interested in the content items are not eligible to receive the content items and users who would likely not be interested in the content items are eligible to receive the content items, resulting in missed opportunities to present users with meaningful content and subsequent user dissatisfaction and loss of user engagement with the online system. As such, there is a need for improvements that would allow an online system to determine an online system user's location relative to a physical location associated with content presented by the online system in a more quick and efficient manner.

SUMMARY

An online system determines an online system user is eligible to be presented with a content item associated with a physical location when the user is at or within a specified distance of the physical location based on stored information describing a polygonal representation of the physical location on a map and received information describing a geographic location of a client device associated with the user. In some embodiments, the content item is a sponsored content item for which the online system receives compensation in exchange for presenting to a user, while in other embodiments, the content item is an organic content item for which the online system does not receive compensation in exchange for presenting to the user. For example, the content item is a location check-in, a post, a status update, an image, an audio file, a video file, an article, or any other type of content associated with a physical location and received from a publishing user of the online system for presentation by the online system. In various embodiments, targeting criteria received along with the content item includes information describing a physical location associated with the content item and specifies users determined by the online system to be at or within a specified distance of the physical location are eligible to receive the content item. For example, the online system receives an article describing a restaurant from an owner of the restaurant along with targeting criteria requesting the online system to present the article to online system users determined to be visiting a physical location of the restaurant or who are visiting a physical location within 50 meters of the restaurant.

If the online system receives targeting criteria describing a physical location associated with a content item, the online system identifies a position of the physical location on a geographic map and determines a polygon having a plurality of edges bounding a representation of the physical location on the map. For example, the online system identifies a plurality of map coordinates representing a position of each corner of a building on a map and traces a polygon on the map having vertices at the identified map coordinates. In various embodiments, the position, size and shape of the polygon represent the position, size and shape of the physical location on the map such that each edge of the polygon corresponds to a wall or other boundary enclosing an area of the physical location on the map. For example, if the physical location is a coffee shop having a rectangular building and an adjacent circular outdoor seating area, the online system determines a polygon having three edges joined at right angles forming three sides of the rectangular building and multiple edges joined at obtuse angles forming the circular seating area adjacent to the building. Hence, the polygon may have an irregular shape defined by multiple edges having different dimensions.

For each polygon determined by the online system, the online system determines edge data describing a position of each edge of the polygon on the map and generates an index for each edge based on the determined edge data. In various embodiments, edge data determined by the online system comprises a plurality of edge coordinates associated with each edge. For example, edge coordinates associated with an edge are grid coordinates which represent a position and size of each edge on the map. Hence, in various embodiments, the online system determines edge data describing a position of each edge of the polygon on the map by determining a plurality of edge coordinates that each identifies a position of a point of an edge on the map relative to one or more fixed axes of the map. Example edge coordinates which comprise the edge data determined by the online system include latitude coordinates, longitude coordinates, y-coordinates, x-coordinates, and any other grid coordinates determined by the online system suitable for identifying a position of a point on a map relative to one or more fixed axes of the map.

Based on the determined edge coordinates associated with each edge of the polygon, the online system generates an edge index for each edge and stores the edge index along with the edge data and an identifier associated with the polygon in an edge data store of the online system. In various embodiments, an edge index generated for an edge comprises a set of edge coordinates representing a position of each endpoint of the edge along a specified axis of the map, such as a vertical axis or a horizontal axis. For example, the online system generates an edge index for an edge comprising latitudinal coordinates identifying a position of each endpoint of the edge on a vertical axis of the map, allowing the online system to store information describing a vertical area of the map occupied by the edge's height on the map (e.g., a vertical footprint of the edge on the map). As another example, the online system generates an edge index for an edge comprising longitudinal coordinates identifying a position of each endpoint of the edge on a horizontal axis of the map, allowing the online system to store information describing a horizontal area of the map occupied by the edge's length on the map. The edge index is stored in the edge data store with the edge data and an identifier of the polygon formed by the edge, in various embodiments.

In some embodiments, the online system also determines an edge boundary surrounding each edge of the polygon on the map and stores information describing the edge boundary in the edge data store along with the edge data, edge index and polygon identifier. While an edge index describes a position and dimension of an edge along a vertical or horizontal axis of the map, an edge boundary describes a position and dimension of the edge along a vertical and horizontal axis of the map, in some embodiments. In various embodiments, the online system determines a geometric boundary circumscribing each edge of the polygon on the map and stores a set of edge boundary coordinates identifying multiple points on the map comprising an edge boundary. For example, a set of edge boundary coordinates identifying a position of each corner of a rectangle circumscribing an edge of the polygon on the map is stored in the edge data store along with the determined edge data, edge indexes and polygon identifier associated with the polygon. In the previous example, a length of a horizontal dimension of the edge boundary corresponds to a length of the edge along a horizontal axis of the map and a height of a vertical dimension of the edge boundary corresponds to a height of the edge along a vertical axis of the map. As another example, the online system determines and stores a set of edge boundary coordinates identifying an area of a circle circumscribing an edge of the polygon on the map. Hence, the online system determines edge data describing a position of each edge of the polygon on the map and uses the edge data to generate edge indexes describing a position of each edge of the polygon along a vertical or horizontal axis of the map and to determine edge boundaries surrounding each edge along a vertical and horizontal axis of the map.

To determine whether an online system user is at or within a threshold distance of the physical location associated with the content item, the online system determines a geographic location associated with the user based on received information describing a geographic location of a client device associated with the user. For example, the online system receives location information describing a geographic location of a client device (e.g., a street address, a location identifier, geographic coordinates, etc.) along with information identifying a user associated with the client device to the online system, allowing the online system to associate the location of the client device with the user. In some embodiments, a client device communicates location information to the online system when a user of the client device requests to share a location with the online system. A client device may also communicate location information to the online system when the client device is within at least a threshold distance from a particular physical location or at various predetermined time intervals. For example, the online system receives location information from a client device when a user checks-in to a physical location via the client device or via an application executing on the client device. As another example, the online system receives location information from a client device or from an application executing on the client device when the client device is within a threshold distance of certain devices for connecting to a network (e.g., wireless access points or cellular phone towers).

Based on the received location information, the online system identifies a position of the geographic location on the map and determines a location point associated with the position. For example, the online system determines a set of location coordinates identifying a position of the geographic location on the map and determines a location point based on the set of location coordinates. A location point identifies a position of the geographic location on the specified axis of the map. For example, if the received location information includes a set of geographic coordinates identifying a latitude and longitude of the geographic location and the specified axis of the map is a vertical axis, the online system determines the location point is the latitude coordinate. As another example, if the online system has generated edge indexes representing a position of each endpoint of an edge of the polygon along a longitudinal axis of the map, the location point identifies a position of the geographic location on the longitudinal axis of the map. The location point may be a latitude coordinate, a longitude coordinate, an x-coordinate, a y-coordinate, or any other grid coordinate determined by the online system suitable for identifying a position of a point on a map relative to one or more fixed axes of the map.

To determine whether the client device is at the physical location, the online system retrieves a set of edges that span the location point along the specified axis of the map. An edge spans the location point along the specified axis of the map if a point of the edge has a position on the specified axis of the map represented by the location point. Additionally, an edge spans the location point along the specified axis of the map if the edge has an endpoint on both sides of the position represented by the location point on the specified axis of the map. For example, if the specified axis of the map is a vertical axis, an edge having endpoints above and below the position identified by the location point on the vertical axis of the map spans the location point along the specified axis of the map. Similarly, if the specified axis of the map is a horizontal axis, an edge having endpoints to the left and right of the position identified by the location point on the horizontal axis of the map spans the location point along the specified axis of the map.

In various embodiments, the online system queries the edge data store using a set of indexed edge coordinates to retrieve the set of edges that span the location point along the specified axis of the map. For example, the online system submits a query to the edge data store that specifies a coordinate representing a position on the specified axis of the map matching the position of the location point and requests a set of edges that span the location point along the specified axis. In response to the query, edges associated with a set of indexed edge coordinates representing a position of each endpoint of the edge on opposite sides of the location point along the specified axis of the map are returned. For example, if the location point identifies a position on the map at latitude 37.4530° N, the online system retrieves a set of edges having an endpoint above and below latitude 37.4530° N.

In some embodiments, the set of edges retrieved by the online system may include edges of different polygons. For example, if the online system receives targeting criteria associated with content items associated with different physical locations and determines a polygon representing each physical location, the edge data and edge indexes stored by the online system include edge coordinates associated with each polygon and the retrieved set of edges includes edges of one or more of each polygon that span the location point along the specified axis of the map. In various embodiments, the online system identifies a polygon associated with each edge included in the set of edges based on a polygon identifier stored with the edge data associated with each edge. Hence, the set of edges spanning the location point may include one or more edges of different polygons.

The online system compares a position of the geographic location and a position of each edge of the set of edges on an additional axis of the map perpendicular to the specified axis and computes a value associated with the set of edges based on the comparison. In various embodiments, the online system performs the comparison by tracing a ray from the position of the geographic location on the map along an axis of the map perpendicular to the specified axis and computes a number of edges of the set of edges intersected by the ray. If the set of edges includes edges of different polygons, the online system computes a number of edges of each polygon included in the set of edges intersected by the ray. For example, the online system computes a number of edges associated with each of one or more polygon identifiers associated with the set of edges intersected by the ray. Based on the computed value, the online system determines whether the client device is within an area of the map represented by the polygon and therefore at the physical location.

In various embodiments, the online system determines the client device is at the physical location if the computed value indicates an odd number of edges of the polygon are intersected by a ray from a position of the geographic location on the map along the additional axis perpendicular to the specified axis. If the computed value is associated with a set of edges including edges of more than one polygon, the online system determines the client device is at a physical location represented by a particular polygon if the value indicates an odd number of edges of the particular polygon are intersected by the ray. For example, the online system identifies a particular polygon having an odd number of edges intersected by the ray based on a polygon identifier associated with the odd number of edges. If the client device is determined to be at the physical location represented by the polygon, the online system determines the user associated with the client device is eligible to be presented with a content item associated with the physical location and provides the content item to the client device for presentation to the user, in some embodiments. For example, the online system identifies and retrieves a stored content item associated with the physical location and communicates the content item to the client device for presentation to the user.

In various embodiments, the online system determines the client device is not at the physical location represented by the polygon if the value associated with the set of edges indicates no edges or an even number of edges of the set of edges is intersected by a ray from a position of the geographic location on the map along the additional axis perpendicular to the specified axis. If the computed value is associated with a set of edges including edges of more than one polygon, the online system determines the client device is not at a physical location represented by a particular polygon if the value indicates no edges or an even number of edges of the particular polygon are intersected by the ray. For example, the online system identifies a particular polygon having an even number of edges intersected by the ray based on a polygon identifier associated with the even number of edges. If the online system determines the client device is not at the physical location represented by a polygon, the online system determines whether the client device is within at least a threshold distance of the physical location. For example, the threshold distance is a specified radius around the physical location provided by a publishing user who submitted targeting criteria associated with the content item to the online system. The online system determines whether the client device is within at least the threshold distance of the physical location based on proximity of a representation of the geographic location of the client device on the map to an edge of the polygon on the map.

To determine whether the geographic location of the client device is within at least the threshold distance of the physical location, the online system determines a location boundary having a radius around a representation of the geographic location on the map corresponding to the threshold distance. In various embodiments, the online system determines a set of location boundary coordinates identifying multiple points on the map comprising the location boundary having the specified radius around the geographic location on the map. For example, if targeting criteria specifies a radius of 50 meters around the physical location, the online system determines a location boundary including a geographic area having a radius of 50 meters around a representation of the geographic location on the map and determines a set of location boundary coordinates identifying a perimeter of a circle comprising the location boundary on the map. The online system retrieves information from the edge data store describing an edge boundary surrounding each edge of the polygon on the map and determines whether the location boundary intersects at least one edge boundary.

In various embodiments, the online system determines the location boundary intersects an edge boundary if a set of location boundary coordinates identify a position on the map also identified by a set of edge boundary coordinates. For example, if both the location boundary and an edge boundary include a position on the map identified by the same x,y coordinate, the online system determines the location boundary intersects the edge boundary. If the online system determines the location boundary intersects an edge boundary, the online system determines the geographic location of the client device is within at least the threshold distance of the physical location associated with the content item. If the geographic location of the client device is determined to be within the threshold distance of the physical location, the online system determines the user associated with the client device is visiting an area within the threshold distance of the physical location and is therefore eligible to be presented with a content item associated with the physical location. In various embodiments, the online system retrieves the content item associated with the physical location and provides the content item to the client device for presentation to the user.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
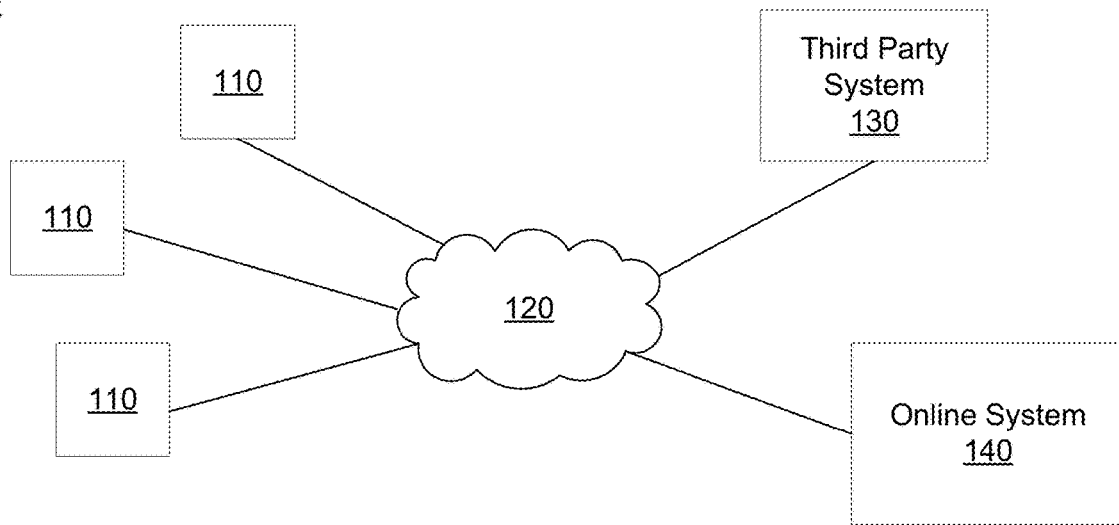
FIG. 1 is a block diagram of a system environment in which an online system operates, in accordance with an embodiment.

FIG. 1 is a block diagram of a system environment 100 for an online system 140. The system environment 100 shown by FIG. 1 comprises one or more client devices 110, a network 120, one or more third-party systems 130, and the online system 140. In alternative configurations, different and/or additional components may be included in the system environment 100. The embodiments described herein can be adapted to social networking systems that are content sharing networks or other online systems 140 providing content to users.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone, a smartwatch or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device 110. In other embodiments, a third party system 130 provides content or other information for presentation via a client device 110. A third party system 130 may also communicate information to the online system 140, such as advertisements, content, or information about an application provided by the third party system 130.

In some embodiments, one or more of the third party systems 130 provide content to the online system 140 for presentation to users of the online system 140 and provide compensation to the online system 140 in exchange for presenting the content. For example, a third party system 130 provides advertisement requests, which are further described below in conjunction with FIG. 2, including advertisements for presentation and amounts of compensation provided by the third party system 130 for presenting the advertisements to the online system 140. Other types of sponsored content may be provided by a third party system 130 to the online system 140 for presentation by the online system 140 in exchange for compensation from the third party system 130. Sponsored content from a third party system 130 may be associated with the third party system 130 or with an entity on whose behalf the third party system 130 operates.

In some embodiments, one or more of the third party systems 130 is a trusted third party system 130 that provides data analysis services to the online 140. For example, a third party system 130 is an entity, such as a data analytics provider, that receives information describing actions performed by users of the online system 140 from the online system 140 or one or more entities external to the online system 140. In various embodiments, the third party system 130 receives information describing actions associated with electronic content presented to various audiences by various content publishers and identifies individuals who performed the actions. In some embodiments, the third party system 130 compiles information describing the actions and the individuals who performed them, and provides the information to the online system 140 as a performance metric or as raw data, which the online system 140 utilizes for generation of a performance metric, as described in more detail in conjunction with FIG. 3 below.

Figure 2:
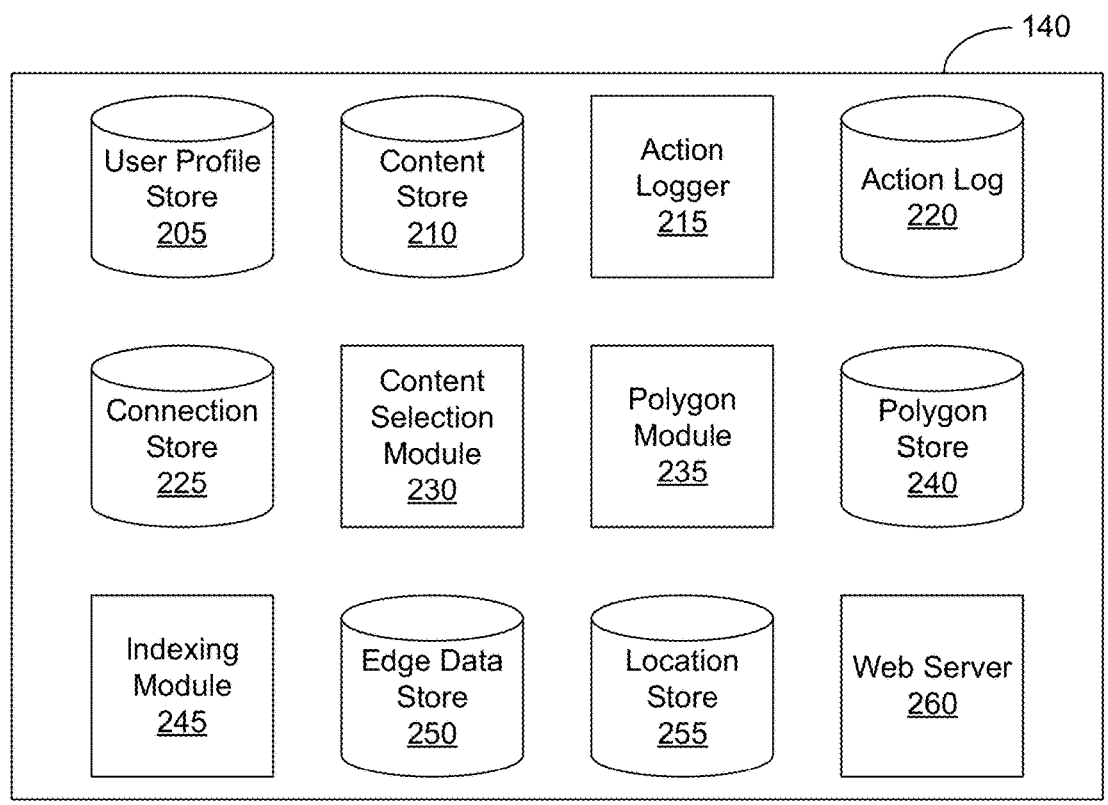
FIG. 2 is a block diagram of an online system, in accordance with an embodiment.

FIG. 2 is a block diagram of an architecture of the online system 140. The online system 140 shown in FIG. 2 includes a user profile store 205, a content store 210, an action logger 215, an action log 220, a connection store 225, a content selection module 230, a polygon module 235, a polygon store 240, an indexing module 245, an edge data store 250, a location store 255, and a web server 260. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image, with information identifying the images in which a user is tagged stored in the user profile of the user. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity. In some embodiments, the brand page associated with the entity's user profile may retrieve information from one or more user profiles associated with users who have interacted with the brand page or with other content associated with the entity, allowing the brand page to include information personalized to a user when presented to the user.

The content store 210 stores objects that each represents various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

One or more content items included in the content store 210 include content for presentation to a user and a bid amount. The content is text, image, audio, video, or any other suitable data presented to a user. In various embodiments, the content also specifies a page of content. For example, a content item includes a landing page specifying a network address of a page of content to which a user is directed when the content item is accessed. The bid amount is included in a content item by a publishing user who provided the content item to the online system 140 and is used to determine an expected value, such as monetary compensation, provided by the publishing user to the online system 140 if content in the content item is presented to an additional user, if the content in the content item receives a user interaction when presented, or if any suitable condition is satisfied when content in the content item is presented to an additional user. For example, the bid amount included in a content item specifies a monetary amount that the online system 140 receives from a publishing user who provided the content item to the online system 140 if content in the content item is displayed. In some embodiments, the expected value to the online system 140 of presenting the content from the content item may be determined by multiplying the bid amount by a probability of the content of the content item being accessed by a user.

Various content items may include an objective identifying an interaction that a publishing user associated with a content item desires other users to perform when presented with content included in the content item. Example objectives include: installing an application associated with a content item, indicating a preference for a content item, sharing a content item with other users, interacting with an object associated with a content item, or performing any other suitable interaction. As content from a content item is presented to online system users, the online system 140 logs interactions between users presented with the content item or with objects associated with the content item. Additionally, the online system 140 receives compensation from a user associated with content item as online system users perform interactions with a content item that satisfy the objective included in the content item.

Additionally, a content item may include one or more targeting criteria specified by the publishing user who provided the content item to the online system 140. Targeting criteria included in a content item request specify one or more characteristics of users eligible to be presented with the content item. For example, targeting criteria are used to identify users having user profile information, connections, or actions satisfying at least one of the targeting criteria. Hence, targeting criteria allow a user to identify users having specific characteristics, simplifying subsequent distribution of content to different users.

In one embodiment, targeting criteria may specify actions or types of connections between a user and another user or object of the online system 140. Targeting criteria may also specify interactions between a user and objects performed external to the online system 140, such as on a third party system 130. For example, targeting criteria identifies users that have taken a particular action, such as sent a message to another user, used an application, joined a group, left a group, joined an event, generated an event description, purchased or reviewed a product or service using an online marketplace, requested information from a third party system 130, installed an application, or performed any other suitable action. Including actions in targeting criteria allows users to further refine users eligible to be presented with content items. As another example, targeting criteria identifies users having a connection to another user or object or having a particular type of connection to another user or object.

In some embodiments, targeting criteria received from a publishing user who provides a content item to the online system 140 describes a physical location associated with the publishing user or the content item and specifies users determined to be at or within a specified distance of the physical location are eligible to receive the content item. The physical location may be a physical location of a retail store, building, or other location where an individual may perform a particular action associated with the content item or the publishing user associated with the content item, such as engaging in a purchase or transaction at the physical location. For example, the online system receives an article including information about a business from a manager of the business along with targeting criteria requesting the online system to present the article to online system users determined to be visiting a physical location of the business or who are visiting a physical location within a specified distance of the business.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

In some embodiments, the action logger 215 receives communications about user actions with content presented to a user and populates the action log 220 with information about the actions. Examples of interactions with content include viewing content items, requesting additional content items for presentation, indicating a preference for a content item, sharing a content item with another user, or performing any other suitable action. A user may interact with content items by providing inputs to a client device 110 presenting content from the online system 140. The client device 110 identifies actions corresponding to various provided inputs and communicates information describing the identified actions to the action logger 215, which stores the information describing the identified actions in the action log 220.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying. Additionally, actions a user performs via an application associated with a third party system 130 and executing on a client device 110 may be communicated to the action logger 215 by the application for recordation and association with the user in the action log 220.

In one embodiment, the connection store 225 stores information describing connections between users and other objects on the online system 140 as connections. Some connections may be defined by users, allowing users to specify their relationships with other users. For example, users may generate connections with other users that parallel the users' real-life relationships, such as friends, co-workers, partners, and so forth. Other connections are generated when users interact with objects in the online system 140, such as expressing interest in a page on the online system 140, sharing a link with other users of the online system 140, and commenting on posts made by other users of the online system 140.

In one embodiment, a connection may include various features each representing characteristics of interactions between users, interactions between users and objects, or interactions between objects. For example, features included in a connection describe a rate of interaction between two users, how recently two users have interacted with each other, a rate or an amount of information retrieved by one user about an object, or numbers and types of comments posted by a user about an object. The features may also represent information describing a particular object or a particular user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, a connection may be represented as one or more feature expressions.

The connection store 225 also stores information about connections, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single connection in the connection store 225, in one embodiment. Alternatively, each interaction between a user and a specific object is stored as a separate connection. In some embodiments, connections between users may be stored in the user profile store 205, or the user profile store 205 may access the connection store 225 to determine connections between users.

The content selection module 230 selects one or more content items for communication to a client device 110 to be presented to a user. Content items eligible for presentation to the user are retrieved from the content store 210 or from another source by the content selection module 230, which selects one or more of the content items for presentation to the user. A content item eligible for presentation to the user is a content item associated with at least a threshold number of targeting criteria satisfied by characteristics of the user or is a content item that is not associated with targeting criteria. In various embodiments, the content selection module 230 includes content items eligible for presentation to the user in one or more selection processes, which identify a set of content items for presentation to the user. For example, the content selection module 230 determines measures of relevance of various content items to the user based on characteristics associated with the user by the online system 140 and based on the user's affinity for different content items. Information associated with the user included in the user profile store 205, in the action log 220, and in the connection store 225 may be used to determine the measures of relevance. Based on the measures of relevance, the content selection module 230 selects content items for presentation to the user. As an additional example, the content selection module 230 selects content items having the highest measures of relevance or having at least a threshold measure of relevance for presentation to the user. Alternatively, the content selection module 230 ranks content items based on their associated measures of relevance and selects content items having a highest positions in the ranking or having at least a threshold position in the ranking for presentation to the user.

Content items eligible for presentation to the user may include content items associated with bid amounts. The content selection module 230 uses the bid amounts associated with ad requests when selecting content for presentation to the user. In various embodiments, the content selection module 230 determines an expected value associated with various content items based on their bid amounts and selects content items associated with a maximum expected value or associated with at least a threshold expected value for presentation. An expected value associated with a content item represents an expected amount of compensation to the online system 140 for presenting the content item. For example, the expected value associated with a content item is a product of the bid amount associated with the content item and a likelihood of the user interacting with the content item. The content selection module 230 may rank content items based on their associated bid amounts and select content items having at least a threshold position in the ranking for presentation to the user. In some embodiments, the content selection module 230 ranks both content items not associated with bid amounts and content items associated with bid amounts in a unified ranking based on bid amounts and measures of relevance associated with content items. Based on the unified ranking, the content selection module 230 selects content for presentation to the user. Selecting content items associated with bid amounts and content items not associated with bid amounts through a unified ranking is further described in U.S. patent application Ser. No. 13/545,266, filed on Jul. 10, 2012, which is hereby incorporated by reference in its entirety.

For example, the content selection module 230 receives a request to present a feed of content (also referred to as a "content feed") to a user of the online system 140. The feed may include one or more content items associated with bid amounts (i.e., "sponsored content items") as well as organic content items, such as stories describing actions associated with other online system users connected to the user. The content selection module 230 accesses one or more of the user profile store 205, the content store 210, the action log 220, and the connection store 225 to retrieve information about the user. For example, information describing actions associated with other users connected to the user or other data associated with users connected to the user are retrieved. Content items from the content store 210 are retrieved and analyzed by the content selection module 230 to identify candidate content items eligible for presentation to the user. For example, content items associated with users who not connected to the user or stories associated with users for whom the user has less than a threshold affinity are discarded as candidate content items. Based on various criteria, the content selection module 230 selects one or more of the content items identified as candidate content items for presentation to the identified user. The selected content items are included in a feed of content that is presented to the user. For example, the feed of content includes at least a threshold number of content items describing actions associated with users connected to the user via the online system 140.

In various embodiments, the content selection module 230 presents content to a user through a feed including a plurality of content items selected for presentation to the user. One or more content items associated with bid amounts may be included in the feed. The content selection module 230 may also determine an order in which selected content items are presented via the feed. For example, the content selection module 230 orders content items in the feed based on likelihoods of the user interacting with various content items.

The polygon module 235 determines a polygon comprising a plurality of edges bounding a representation of a physical location on a geographic map. In some embodiments, the physical location is associated with an online system user or a content item provided to the online system 140 by an online system user for presentation by the online system 140. For example, the physical location is a physical location of a retail store, a building, or other location where an individual may perform a particular action (e.g., a purchase or transaction) associated with a content item presented by the online system 140 or a user associated with the content item. In various embodiments, the physical location is described by targeting criteria received along with a content item which identifies a physical location associated with the content item and specifies users determined to be at or within a specified distance of the physical location are eligible to receive the content item. For example, the online system 140 receives a post describing an exhibit at a natural history museum from an administrator of the museum along with targeting criteria requesting the online system 140 to present the post to online system users determined to be visiting a physical location of the museum or who are visiting a physical location within 50 meters of the museum.

If the online system 140 receives targeting criteria describing a physical location associated with an online system user or a content item provided by the user, the polygon module 235 identifies a position of the physical location on a geographic map and determines a polygon representing the physical location on the map. For example, the polygon module 235 identifies a plurality of map coordinates representing a position of each corner of a building associated with a content item on a map and traces a polygon on the map having vertices at the identified map coordinates. In various embodiments, the polygon module 235 also generates a polygon identifier associated with each determined polygon and stores the polygon identifier with information describing the polygon, the physical location represented by the polygon and the user and/or content item associated with the physical location in the polygon store 240.

In various embodiments, the position, size and shape of the polygon represent the position, size and shape of the physical location on the map such that each edge of the polygon corresponds to a wall or other boundary enclosing an area of the physical location on the map. For example, if the physical location is a coffee shop having a rectangular building and an adjacent semi-circular seating area, the polygon module 235 determines a polygon having three edges joined at right angles forming three sides of the rectangular building and multiple edges joined at obtuse angles forming the semi-circular seating area adjacent to the building. Hence, the polygon may have an irregular shape defined by multiple edges having different dimensions.

The polygon store 240 stores information describing polygons determined by the polygon module 235. In various embodiments, the polygon module 235 determines polygons representing physical locations associated with a user or content item provided by the user and polygon identifiers associated with each determined polygon. The polygon store 240 stores a polygon identifier generated for each polygon in association with information describing the polygon, the physical location represented by the polygon and the user and/or content item associated with the physical location. For example, information stored in the polygon store 240 along with a polygon identifier generated for a polygon includes a building identifier associated with a physical location represented by the polygon, geographic coordinates representing a position of each corner of the building on a map, and a content item identifier associated with a content item associated with the physical location. Hence, the polygon store 240 stores information from which the online system 140 may identify a polygon associated with a physical location and an online system user and/or content item associated with the polygon and physical location.

The indexing module 245 determines edge data describing a position of each edge of a polygon on a geographic map and generates an edge index associated with each edge based on the edge data. In various embodiments, edge data determined by the indexing module 245 comprises a plurality of edge coordinates associated with each edge. Edge coordinates associated with an edge are grid coordinates which collectively represent a position and size of the edge on a geographic map. Example edge coordinates include latitude coordinates, longitude coordinates, y-coordinates, x-coordinates, and any other grid coordinates suitable for identifying a position of a point on a map relative to one or more fixed axes of the map. Hence, the indexing module 245 determines edge data describing a position of each edge of a polygon determined by the polygon module 235 on a map by determining a plurality of edge coordinates that each identifies a position of a point of an edge on the map relative to one or more fixed axes of the map. For example, the indexing module 245 retrieves information describing a location of a polygon on a geographic map from the polygon store 240 and determines map coordinates for each point of each edge of the polygon on the map.

The indexing module 245 also generates an edge index for each edge of a polygon based on the edge data determined for each edge of the polygon. An edge index generated for an edge comprises a set of edge coordinates representing a position of each endpoint of the edge along a specified axis of a geographic map, such as a vertical axis or a horizontal axis. For example, the indexing module 245 generates an edge index for an edge of a polygon comprising latitudinal coordinates identifying a position of each endpoint of the edge on a vertical axis of the map, allowing the online system 140 to store information describing a vertical area of the map occupied by the edge's height on the map (e.g., a vertical footprint of the edge on the map). As another example, the indexing module 245 generates an edge index for an edge comprising longitudinal coordinates identifying a position of each endpoint of the edge on a horizontal axis of the map, allowing the online system 140 to store information describing a horizontal area of the map occupied by the edge's length on the map. Each edge index generated by the indexing module 245 is stored by the indexing module 245 in the edge data store 250 along with the edge data associated with the edge and an identifier associated with the polygon formed by the edge, in various embodiments.

In some embodiments, the indexing module 245 also determines an edge boundary surrounding each edge of a polygon on a geographic map and stores information describing the edge boundary in the edge data store 250. While an edge index describes a position and dimension of an edge along a vertical or horizontal axis of the map, an edge boundary describes a position and dimension of the edge along a vertical and horizontal axis of the map, in some embodiments. In various embodiments, the indexing module 245 determines a geometric boundary circumscribing each edge of a polygon on a map and stores a set of edge boundary coordinates identifying multiple points on the map comprising an edge boundary. For example, the indexing module 245 determines and stores a set of edge boundary coordinates identifying a position of each corner of a rectangle circumscribing an edge of a polygon on a map. In the preceding example, a length of a horizontal dimension of the edge boundary corresponds to a length of the edge along a horizontal axis of the map and a height of a vertical dimension of the edge boundary corresponds to a height of the edge along a vertical axis of the map. As another example, the indexing module 245 determines and stores a set of edge boundary coordinates identifying an area of a circle circumscribing an edge of a polygon on a map. In various embodiments, information describing each determined edge boundary is stored in the edge data store 250 along with edge data associated with an edge for which the edge boundary was determined, an edge index associated with the edge, and a polygon identifier associated with a polygon formed by the edge. Hence, the indexing module 245 determines edge data describing a position of each edge of a polygon on a map and uses the edge data to generate edge indexes describing a position of each edge of the polygon along a vertical or horizontal axis of the map and to determine edge boundaries surrounding each edge along a vertical and horizontal axis of the map, in some embodiments.

The edge data store 250 stores information determined or generated by the indexing module 245 describing edges of polygons representing physical locations on a geographic map. In various embodiments, information stored in the edge data store 250 includes edge data, edge indexes and edge boundary coordinates associated with each edge of a polygon determined by the polygon module 235. For example, the edge data store 250 includes edge data comprising a set of map coordinates representing a position of each point of each edge of a polygon on a map, a set of edge indexes comprising a set of endpoint coordinates associated with each edge of the polygon identifying a position of each endpoint of an edge along a specified axis of the map, and a set of edge boundary coordinates representing a position of each corner of a geometric boundary surrounding each edge of the polygon on the map. In various embodiments, a polygon identifier generated by the polygon module 235 and stored in association with the information included in the edge data store 250 allows the online system 140 to identify a polygon associated with each edge described by the stored information. For example, the online system 140 retrieves edge data describing an edge of a polygon from the edge data store 250 and identifies the polygon by matching a polygon identifier stored in association with the edge data and a polygon identifier stored in the polygon store 240 in association with information describing the polygon. Hence, the edge data store 250 stores information from which the online system 140 may identify positions of edges of a polygon on a map and a polygon formed by the edges.

In some embodiments, the online system 140 queries the edge data store 250 for edges having a specified position on a map using a set of indexed edge coordinates and identifies one or more polygons formed by the set of edges based on one or more polygon identifiers associated with edges of the set. In one embodiment, the online system 140 queries the edge data store 250 to retrieve a set of edges associated with edge indexes describing a position of each endpoint of an edge above and below a specified position on a vertical axis of a map and performs one or more operations on the set of edges. For example, the online system 140 performs one or more operations on the set of edges to determine whether an online system user is within an area of a map represented by a polygon based on the retrieved set of edges, as described below in conjunction with FIGS. 3-9.

In various embodiments, the location Store 255 stores location information received from client devices 110 associated with online system users describing geographic locations of the client devices 110 and user identifying information identifying online system users associated with the client devices. Location information is any information suitable for identifying a geographic location of a client device 110 associated with an online system user from which the online system 140 may determine a geographic location of the online system user. For example, location information describes a street address, a location identifier and/or geographic coordinates of a geographic location of a client device 110 and information identifying a user associated with the client device 110 to the online system 140 (e.g., a user identifier of the user), which the online system 140 associates with the user and stores in the location store 255.

In some embodiments, the online system 140 receives location information along with information identifying an online system user from a client device 110 associated with the user, while in other embodiments, the online system 140 receives location information from a client device 110 associated with an online system user and subsequently retrieves information identifying the user from the client device 110. In various embodiments, the online system 140 receives location information describing a geographic location of a client device 110, a time associated with the geographic location, and information identifying a user associated with the client device 110, and stores the received information in association with the identified user in the location store 255 for subsequent retrieval.

Location information may be communicated to the online system 140 by a client device 110 or an application executing on the client device 110 when a user of the client device 110 requests to share a location with the online system 140. For example, the online system 140 receives location information from a client device 110 when a user of the client device 110 requests to share a location with the online system 140 by checking-in to a physical location (e.g., a restaurant) via the client device 110 or via an application executing on the client device 110. Location information may also be communicated to the online system 140 by a client device 110 or an application executing on the client device 110 when the client device 110 is within a threshold distance of a specified location, at periodic time intervals, or when any other suitable condition is satisfied. For example, the online system 140 receives location information from a client device 110 or an application executing on the client device 110 when the client device 110 is within a threshold distance of certain devices for connecting to a network (e.g., wireless access points or cellular phone towers). As another example, the online system 140 receives location information from a client device 110 or an application executing on the client device 110 when a location of the client device 110 changes, allowing the online system 140 to maintain information describing a current location of the client device 110.

In some embodiments, the online system 140 receives location information from a third party system 130 that combines a geographic location of a client device 110 with information identifying a user of the client device 110 to the online system 140. For example, the online system 140 receives a geographic location of a user of the online system 140 and information identifying the user to the online system 140 from a third party system 130 and stores the geographic location in association with the identified user in the location store 255. In the preceding example, the third party system 130 may receive information indicating the user visited the geographic location via a client device 110 associated with the third party system 130. For example, the third party system 130 identifies the online system user based on information provided to the third party system 130 by the user at a point of sale terminal used by the user to engage in a financial transaction at the location.

In some embodiments, the online system 140 updates location information stored in the location store 255 (e.g., upon receipt of updated location information) to include a historical record of a user's locations over various time intervals. If the online system 140 updates stored location information, the online system 140 may maintain location information previously stored in the location store 255 when the updated location information is stored or may remove previously stored location information from the location store 255 and store the updated location information in its place, in various embodiments For example, the online system 140 receives updated location information in response to a change in the location of a client device 110 associated with an online system user and stores the updated location information in the location store 255 along with location information previously received from the client device 110 within a particular time interval In some embodiments, location information identifies a geographic location associated with a content item presented by the online system 140 or a user who provided the content item to the online system 140 for presentation by the online system 140. Additionally, location information may identify an occurrence of an event associated with the content item or user who provided the content item to the online system 140. For example, location information identifies physical locations of retail stores, buildings, or other locations where a user has performed a particular action (e.g., a purchase or transaction) associated with a content item presented by the online system 140 or a user associated with the content item. In various embodiments, a publishing user who provides content to the online system 140 or a user associated with the content identifies an action and a physical location associated with the action, and location information received by the online system 140 identifies users that performed the action at the physical location.

In some embodiments, location information stored in the location store 255 also includes various attributes of the locations, such as types of connections to a network (e.g., BLUETOOTH®, 802.11, global positioning system, etc.) available from a location, identifiers of wireless access points within a threshold distance of the location, identifiers of cellular phone towers within a threshold distance of the location, or other suitable information. For example, location information describing an event occurring at a physical location associated with a content item presented by the online system 140 includes a type of network connection available at the location for transmitting information from a client device 110 to the online system 140.

The web server 260 links the online system 140 via the network 120 to the one or more client devices 110, as well as to the one or more third party systems 130. The web server 260 serves web pages, as well as other content, such as JAVA®, FLASH®, XML and so forth. The web server 260 may receive and route messages between the online system 140 and the client device 110; for example, the messages are instant messages, queued messages (e.g., email), text messages, short message service (SMS) messages, or messages sent using any other suitable messaging technique. A user may send a request to the web server 260 to upload information (e.g., images or videos) that are stored in the content store 210. Additionally, the web server 260 may provide application programming interface (API) functionality to send data directly to native client device operating systems, such as IOS®, ANDROID™, WEBOS® or BlackberryOS.

Figure 3:
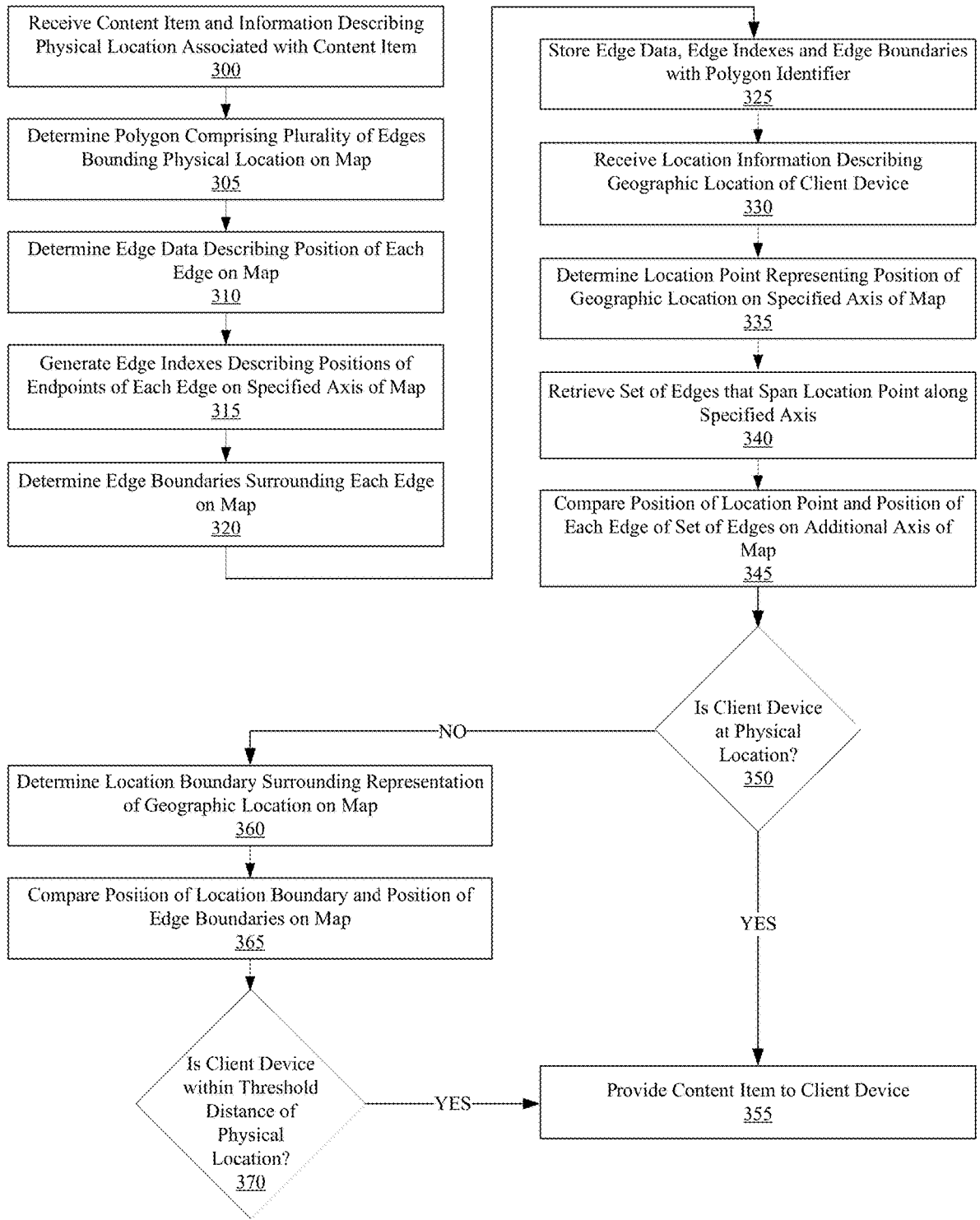
FIG. 3 is a flow chart of a method for determining eligibility of an online system user for receiving a content item associated with a physical location using a polygonal representation of the physical location, in accordance with an embodiment.
Figure 4:
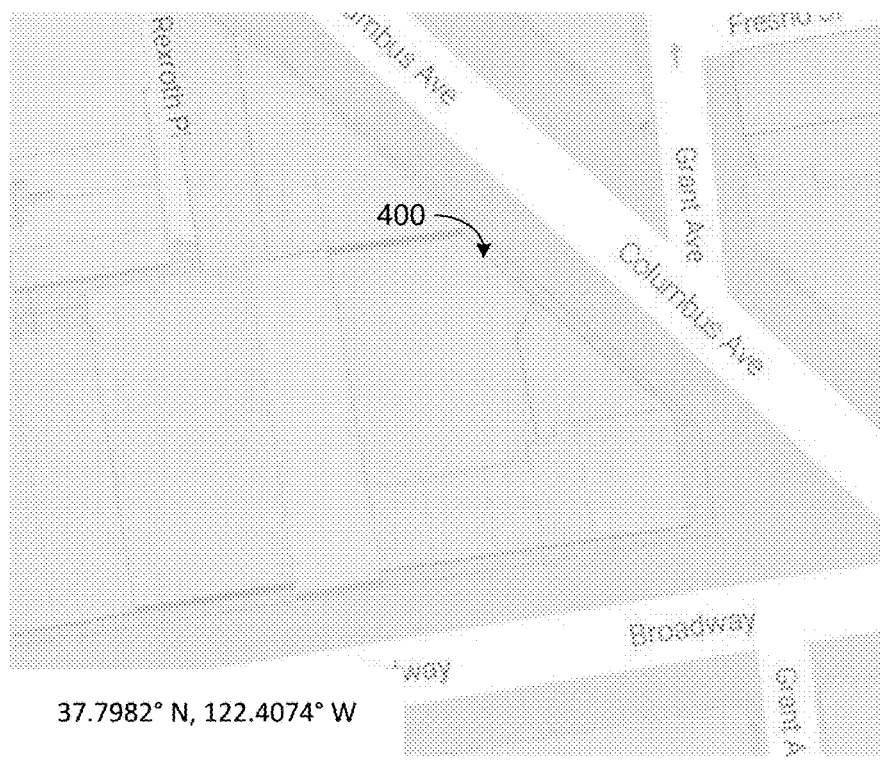
FIG. 4 is an example position of a physical location associated with a content item on a map and a polygon representing the physical location on the map, in accordance with an embodiment.
Figure 4:
Figure 5A:
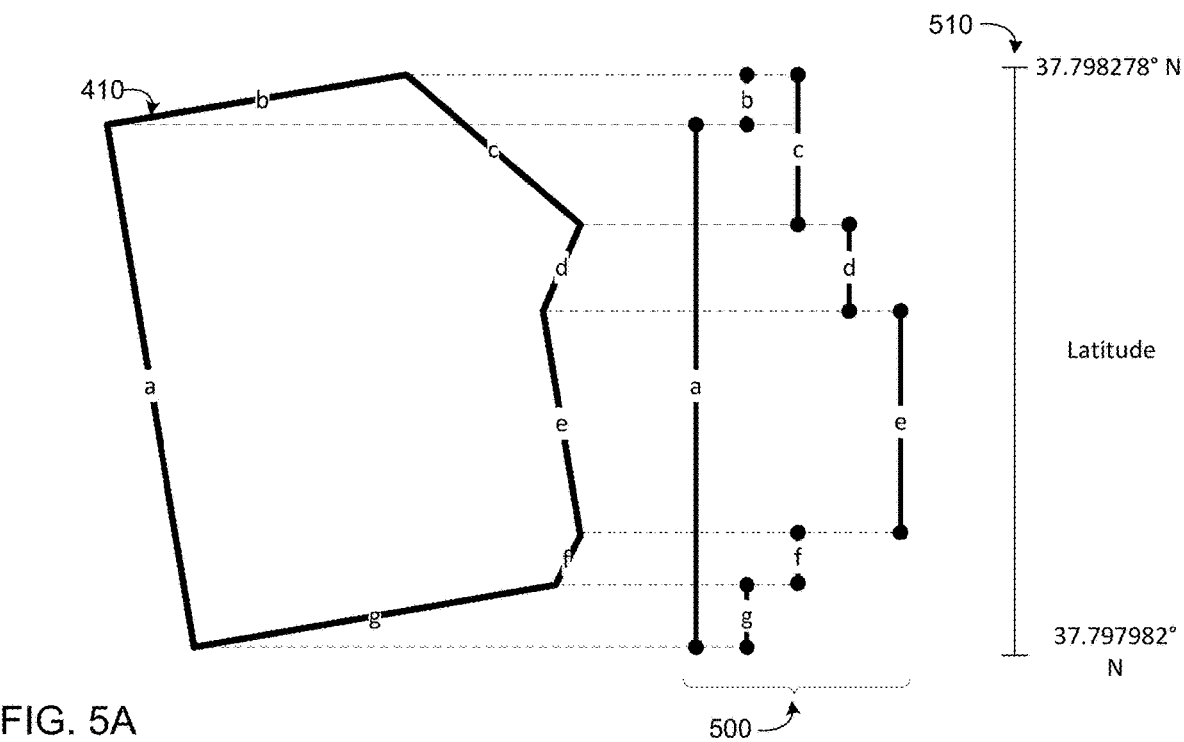
FIG. 5A is an example of indexed edge coordinates describing a position of each endpoint of each edge of a polygon representing a physical location along a specified axis of a map, in accordance with an embodiment.
Figure 5B:
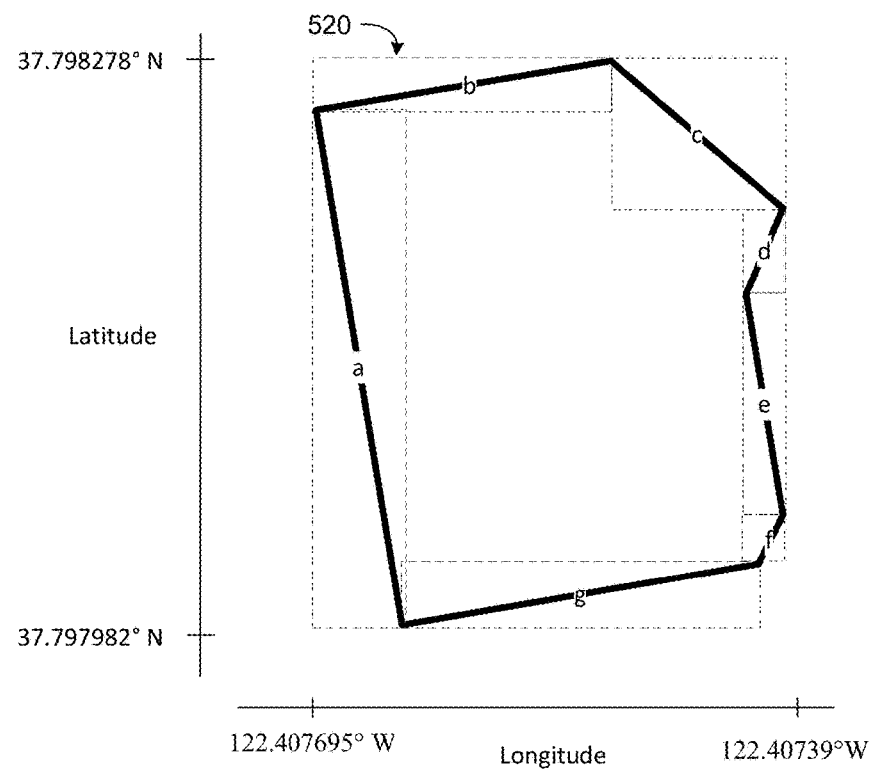
FIG. 5B is an example of edge boundaries surrounding edges of a polygon representing a physical location on a map, in accordance with an embodiment.

Determining an Online System User's Eligibility for Receiving a Content Item Associated with a Physical Location Using a Polygon Representing the Physical Location FIG. 3 is a flow chart of a method for determining an online system user's eligibility for receiving a content item associated with a physical location using a polygon representing the physical location. In other embodiments, the method may include different and/or additional steps than those shown in FIG. 3. Additionally, steps of the method may be performed in different orders than the order described in conjunction with FIG. 3 in various embodiments.

The online system 140 receives 300 a content item and information describing a physical location associated with the content item from an online system user. In some embodiments, the content item is a sponsored content item for which the online system 140 receives compensation in exchange for presenting to online system users, while in other embodiments, the content item is an organic content item for which the online system 140 does not receive compensation in exchange for presenting to the users. Example types of content items received 300 by the online system 140 include location check-ins, posts, status updates, images, audio data, video data, articles, etc. In various embodiments, the online system 140 receives 300 the content item from a publishing user of the online system 140 with a request to present the content item to additional online system users meeting certain targeting criteria which specify characteristics of online system users eligible to be presented with the content item.

In various embodiments, targeting criteria received 300 along with the content item includes information describing the physical location associated with the content item and specifies users determined by the online system 140 to be at or within a specified distance of the physical location are eligible to receive the content item. The physical location associated with the content item may be a building, a landmark, a retail store, a neighborhood or any other physical location associated with an online system user from whom the content item was received or with a product or service identified by the content item (including physical locations where brands, products or services associated with the content item may be promoted or sold). Example types of information describing the physical location associated with the content item include: a building identifier, a street address, a set of geographic coordinates, a neighborhood identifier, and a landmark identifier. As an example, the online system 140 receives 300 an article describing a restaurant from an owner of the restaurant along with targeting criteria requesting the online system 140 to present the article to online system users determined to be visiting a physical location of the restaurant or who are visiting a physical location within 70 meters of the restaurant. For example, the targeting criteria includes a street address identifying the physical location of the restaurant to the online system 140.

Based on the received information describing the physical location associated with the content item, the online system 140 identifies a position of the physical location on a geographic map and determines 305 a polygon having a plurality of edges bounding a representation of the physical location on the map. For example, referring to FIG. 4, the online system 140 identifies a representation 400 of the physical location on a geographic map and determines a plurality of map coordinates representing a position of each corner of a building at the physical location on the map. In this example, the online system 140 traces a polygon 410 on the map having vertices at the identified map coordinates such that the edges of the polygon 410 bound the representation 400 of the physical location on the map.

In various embodiments, the position, size and shape of the polygon 410 represent the position, size and shape of the physical location on the map and each edge of the polygon 410 corresponds to a wall or other boundary enclosing an area of the physical location on the map. For example, if the physical location is a coffee shop having a rectangular building and an adjacent circular outdoor seating area, the online system 140 determines 305 a polygon 410 having three edges joined at right angles forming three sides of the rectangular building and multiple edges joined at obtuse angles forming the circular seating area adjacent to the building. Hence, the polygon 410 may have an irregular shape defined by multiple edges having different dimensions.

The online system 140 determines 310 edge data describing a position of each edge of the polygon 410 on the map and stores 325 the edge data in the edge data store 250 of the online system 140. In various embodiments, the edge data determined 310 by the online system 140 comprises a plurality of edge coordinates associated with each edge of the polygon 410 that represent a plurality of points on the map comprising each edge. For example, edge coordinates associated with an edge include grid coordinates that each represent a position of each point of the edge on the map and collectively represent a position of the edge on the map. Example edge coordinates which comprise the edge data determined 310 by the online system 140 include latitude coordinates, longitude coordinates, y-coordinates, x-coordinates, and any other grid coordinates determined 310 by the online system 140 which are suitable for identifying a position of a point on a map relative to one or more fixed axes of the map. Hence, in some embodiments, the online system 140 determines 310 edge data describing a position of each edge of the polygon 410 on the map by determining 310 a plurality of edge coordinates that each identifies a position of a point of an edge on the map relative to one or more fixed axes of the map. In various embodiments, the edge data is stored 325 in the edge data store 250 along with an identifier associated with the polygon 410 formed by the edge, allowing the online system 140 to identify a polygon 410 associated with the edge data.

Based on the determined edge data, the online system 140 generates 315 and stores 325 an edge index for each edge of the polygon 410 describing a position of each endpoint of the edge along a specified axis of the map. In some embodiments, the specified axis of the map is a vertical axis, while in other embodiments, the specified axis of the map is a horizontal axis. In various embodiments, the edge index generated 315 for each edge comprises a set of edge coordinates representing a position of each endpoint of the edge along the specified axis of the map. Once generated 315, an edge index is stored 325 in the edge data store 250 with the edge data and an identifier associated with the polygon formed by the edge, in various embodiments.

Storing 325 an edge index for each edge of the polygon 410 allows the online system 140 to store 325 information describing an area of the map occupied by a dimension of the edge (e.g., a vertical or horizontal footprint of the edge) for subsequent retrieval. For example, referring to FIG. 5A, the online system 140 identifies latitudinal edge coordinates included in the edge data for each edge of the polygon 410 and determines a position of each endpoint 500 of each edge along a vertical axis of the map. The online system 140 generates 315 an edge index for each edge comprising latitudinal coordinates 510 that identify a position of each endpoint 500 of the edge on a vertical axis of the map, allowing the online system 140 to store 325 information describing a vertical area of the map occupied by each edge's height on the map (e.g., a vertical footprint of the edge on the map). As another example, the online system 140 generates 315 an edge index for an edge comprising longitudinal coordinates identifying a position of each endpoint of the edge on a horizontal axis of the map, allowing the online system 140 to store 325 information describing a horizontal area of the map occupied by the edge's length on the map.

Figure 6:
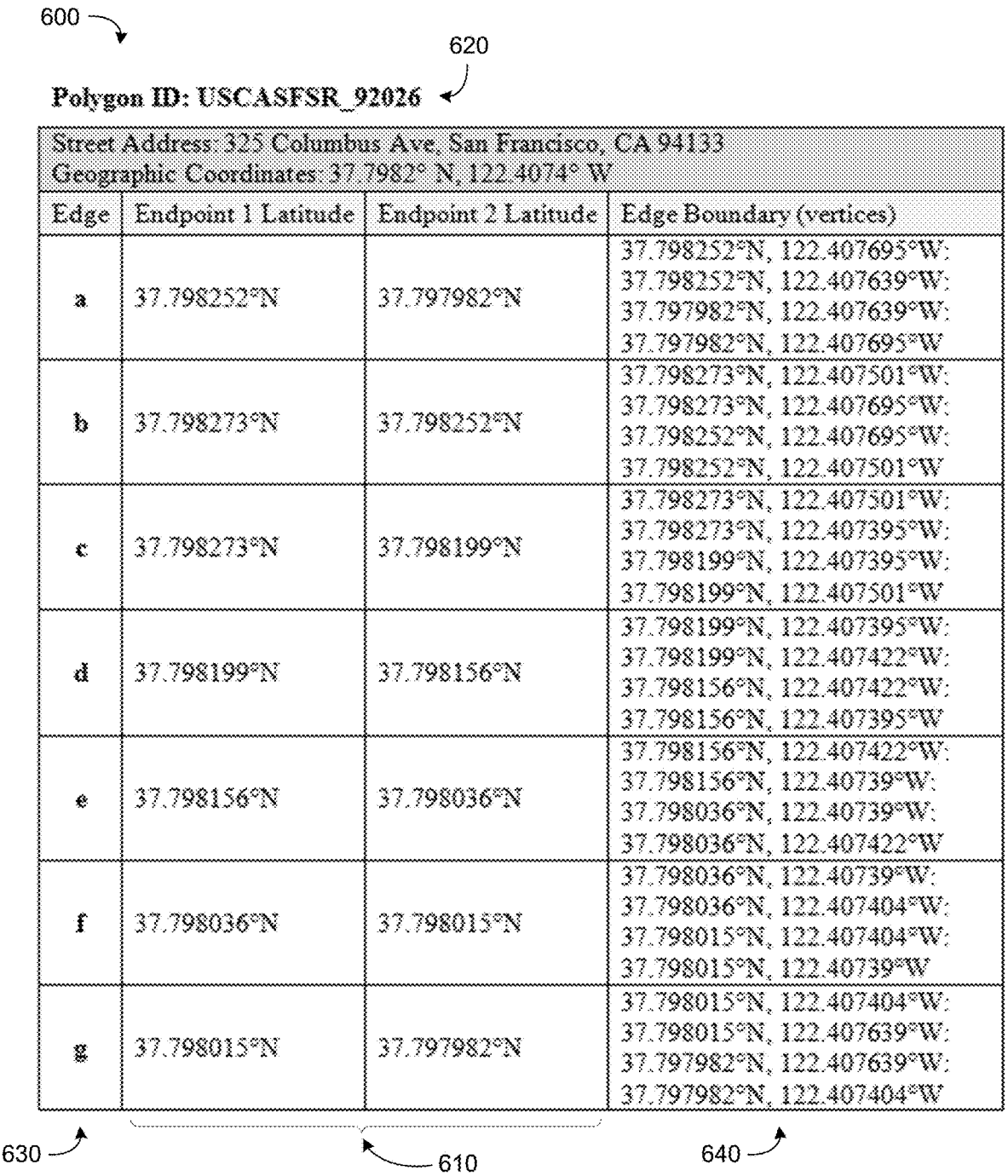
FIG. 6 is an example edge data table including edge data, edge indexes, and edge boundaries stored in an edge data store of the online system, in accordance with an embodiment.

The online system 140 stores 325 each edge index in the edge data store 250 along with the edge data and an identifier associated with the polygon 410. For example, referring to FIG. 6, the online system 140 generates and stores 325 an edge data table 600 including a plurality of edge indexes 610 generated 315 for each edge of the polygon 410 and a polygon identifier 620 associated with the polygon 410. In this example, each edge index 610 comprises latitudinal coordinates 510 identifying a position of each endpoint 500 of the edge on a vertical axis of the map. The polygon identifier 620 stored in association with an edge index 610 and edge data allows the online system 140 to identify a polygon 410 formed by an edge associated with the edge index 610 and edge data. As shown in FIG. 6, each edge index 610 is also stored 325 in association with an edge identifier 630, in some embodiments. An edge identifier 630 stored in association with each edge index 610 allows the online system 140 to identify an edge having endpoints 500 described by the associated edge index 610. For example, the online system 140 identifies edges associated with edge identifiers 630 stored in association with certain edge indexes 610 and performs operations on the identified edges to determine an online system user's eligibility to receive the content item associated with the physical location, as described in further detail below in conjunction with FIGS. 7-10.

Referring back to FIG. 3, in various embodiments, the online system 140 also determines 320 an edge boundary surrounding each edge of the polygon 410 on the map and stores 325 information describing the edge boundary in the edge data store 250 along with the edge data, edge index 610 and polygon identifier 620 associated with the edge. While an edge index 610 describes a position and dimension of an edge along a vertical or horizontal axis of the map, an edge boundary describes a position and dimension of the edge along a vertical and horizontal axis of the map, in some embodiments. In various embodiments, the online system 140 determines 320 a geometric boundary circumscribing each edge of the polygon 410 on the map and stores 325 a set of edge boundary coordinates identifying multiple points on the map comprising an edge boundary associated with each edge. For example, referring to FIG. 5B, the online system 140 traces a rectangular edge boundary 520 circumscribing an edge of the polygon on the map such that a length of a horizontal dimension of the edge boundary 520 corresponds to a length of the edge along a longitudinal axis of the map and a height of a vertical dimension of the edge boundary 520 corresponds to a height of the edge along a latitudinal axis of the map. In this example, the online system 140 determines 320 a set of edge boundary coordinates identifying a position of each corner of the rectangular edge boundary 520 on the map and stores 325 the set of edge boundary coordinates in the edge data store 250 along with the edge data, edge indexes 610 and polygon identifier 620.

In the example of FIG. 6, the online system 140 stores 325 a set of edge boundary coordinates 640 determined 320 for each edge of the polygon 410 in an edge data table 600 in association with an edge identifier 630 associated with an edge and a polygon identifier 620 associated with the polygon 410. In this example, each set of edge boundary coordinates 640 associated with an edge comprises latitudinal and longitudinal coordinates identifying a position of each corner of the edge boundary 520 relative to a horizontal and vertical axis of the map. In other embodiments, the online system 140 determines 320 and stores 325 a set of edge boundary coordinates identifying an area or circumference of a circle which circumscribes an edge of the polygon 410 on the map and forms an edge boundary around the edge. Hence, the online system 140 determines 310 edge data describing a position of each edge of the polygon 410 on the map and uses the edge data to generate 315 edge indexes describing a position of each endpoint of each edge of the polygon 410 along a vertical or horizontal axis of the map and to determine 320 edge boundaries surrounding each edge along a vertical and horizontal axis of the map.

To determine whether an online system user is at or within a threshold distance of the physical location, the online system 140 determines a geographic location associated with the user based on received location information describing a geographic location of a client device 110 associated with the user. In various embodiments, the online system 140 receives 330 location information and user identifying information from a client device 110 associated with the user, allowing the online system 140 to determine a geographic location of the user. For example, location information received 330 by the online system 140 includes a street address, a location identifier and/or geographic coordinates of a geographic location of a client device 110; user identifying information received 330 along with the location information includes a user identifier associated with an online system user associated with the client device 110. In various embodiments, the online system 140 determines a geographic location of a user by associating a geographic location of a client device 110 described by the location information and an online system user identified by the user identifying information, i.e. the user identified by the user identifying information is determined to be at the geographic location described by the location information.

In various embodiments, location information is received 330 from a client device 110 when a user of the client device 110 requests to share a location with the online system 140. For example, the online system 140 receives 330 location information from a client device 110 when a user checks-in to a physical location via the client device 110 or via an application executing on the client device 110. The online system 140 may also receive 330 location information from a client device 110 when the client device 110 is within at least a threshold distance from a particular physical location or at various predetermined time intervals, in some embodiments. For example, the online system 140 receives 330 location information from a client device 110 or from an application executing on the client device 110 when the client device 110 is within a threshold distance of certain devices for connecting to a network (e.g., wireless access points or cellular phone towers).

In yet other embodiments, the online system 140 receives 330 location information from a third party system 130 that combines a geographic location of a client device 110 with information identifying a user of the client device 110 to the online system 140. For example, the online system 140 receives 330 location information from a third party system 130 identifying a physical location associated with the third party system 130 along with information identifying an online system user who visited the physical location. The physical location associated with the third party system 130 and information identifying the online system user are combined to form location information that is communicated to the online system 140 by a device associated with the third party system 130, such as a point of sale terminal used by the user to engage in a financial transaction at a physical location, or may be obtained from the device by the third party system 130, which communicates the location information to the online system 140.

Based on the received location information, the online system 140 identifies a position of the geographic location on the map and determines 335 a location point representing a position of the geographic location on the specified axis of the map. For example, the online system 140 determines a set of location coordinates identifying a position of the geographic location on the map and determines 335 a location point based on the set of location coordinates; the location point identifies a position of the geographic location on the specified axis of the map. For example, if the received location information includes a set of geographic coordinates identifying a latitude and longitude of the geographic location and the specified axis of the map is a vertical axis, the online system 140 determines 335 the location point is the received latitude coordinate. As another example, if the online system 140 has generated 315 edge indexes representing a position of each endpoint of an edge of the polygon 410 along a longitudinal axis of the map, the location point identifies a position of the geographic location on the longitudinal axis of the map.

Figure 7A:
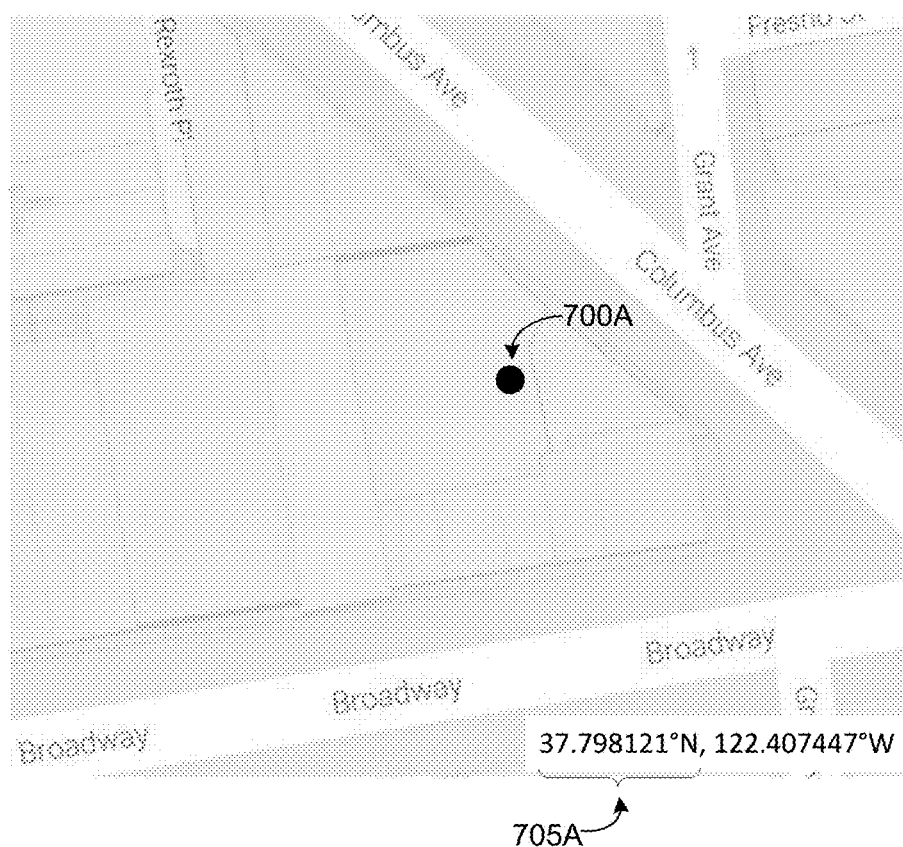
FIG. 7A is an example position of a geographic location of a client device associated with an online system user on a map and a location point identifying a position of the geographic location on a specified axis of the map, in accordance with an embodiment.

The location point may be a latitude coordinate, a longitude coordinate, an x-coordinate, a y-coordinate, or any other grid coordinate determined 335 by the online system 140 which is suitable for identifying a position of a point on a map relative to one or more fixed axes of the map. In the example of FIG. 7A, the online system 140 receives 330 location information describing a geographic location 700A of a client device 110 associated with an online system user and determines a set of location coordinates identifying a position of the geographic location 700A on the map. In this example, the online system 140 determines a set of location coordinates identifying a position of the geographic location 700A on the map are 37.798121° N, 122.407447° W. Based on the set of location coordinates, the online system 140 determines 335 a location point identifying a position of the geographic location 700A on the specified axis of the map, which is the vertical axis of the map in this example. Hence, in this example, the location point corresponds to the latitude coordinate 705A of 37.798121° N. As another example, referring to FIG. 7B, the online system 140 receives 330 location information describing a geographic location 700B of a client device 110 associated with an online system user and determines a set of location coordinates identifying a position of the geographic location 700B on the map are 37.798221° N, 122.407088° W. Based on the set of location coordinates, the online system 140 determines 335 a location point identifying a position of the geographic location 700B on the vertical axis of the map is the latitude coordinate 705B of 37.798221° N.

Returning to FIG. 3, to determine whether the client device 110 is at the physical location, the online system 140 retrieves 340 a set of edges of the polygon 410 that span the location point along the specified axis of the map. An edge spans the location point along the specified axis of the map if a point of the edge has a position on the specified axis of the map represented by the location point. Additionally, an edge spans the location point along the specified axis of the map if the edge has an endpoint on both sides of the location point along the specified axis of the map. For example, if the specified axis of the map is a vertical axis, an edge having endpoints above and below the position identified by the location point on the vertical axis of the map spans the location point along the specified axis of the map. Similarly, if the specified axis of the map is a horizontal axis, an edge having endpoints to the left and right of the position identified by the location point on the horizontal axis of the map spans the location point along the specified axis of the map.

In various embodiments, the online system 140 queries the edge data store 250 using a set of indexed edge coordinates to retrieve 340 the set of edges that span the location point along the specified axis of the map. In some embodiments, the online system 140 submits a query to the edge data store 250 that specifies a coordinate representing a position on the specified axis of the map matching the position of the location point and requests a set of edges that span the location point along the specified axis. In response to the query, edges associated with a set of indexed edge coordinates representing a position of each endpoint of the edge on opposite sides of the location point along the specified axis of the map are returned. For example, referring to FIG. 8A, the online system 140 queries the edge data store 250 for a set 805 of edges 810A, E that span a latitude coordinate 705A of 37.798121° N, which identifies a position on the map of the location point 800A determined 335 by the online system 140 in the example of FIG. 7A. In response to this query, a set 805 of edges 810A, E associated with indexed edge coordinates representing a position of each endpoint of the edges 810A, E above and below the latitude coordinate 705A of 37.798121° N are retrieved 340. In this example, the retrieved set 805 of edges 810A, E includes an edge 810A having a set of indexed edge coordinates at latitude 37.798252° N and 37.797982° N, and an edge 810E having a set of indexed edge coordinates at latitude 37.798156° N and 37.798036° N. Hence, the online system 140 retrieves 340 edges 810A, E which have endpoints above and below latitude 37.798121° N and therefore span the location point 800A based on the set of indexed endpoints described by the stored edge indexes.

Figure 7B:
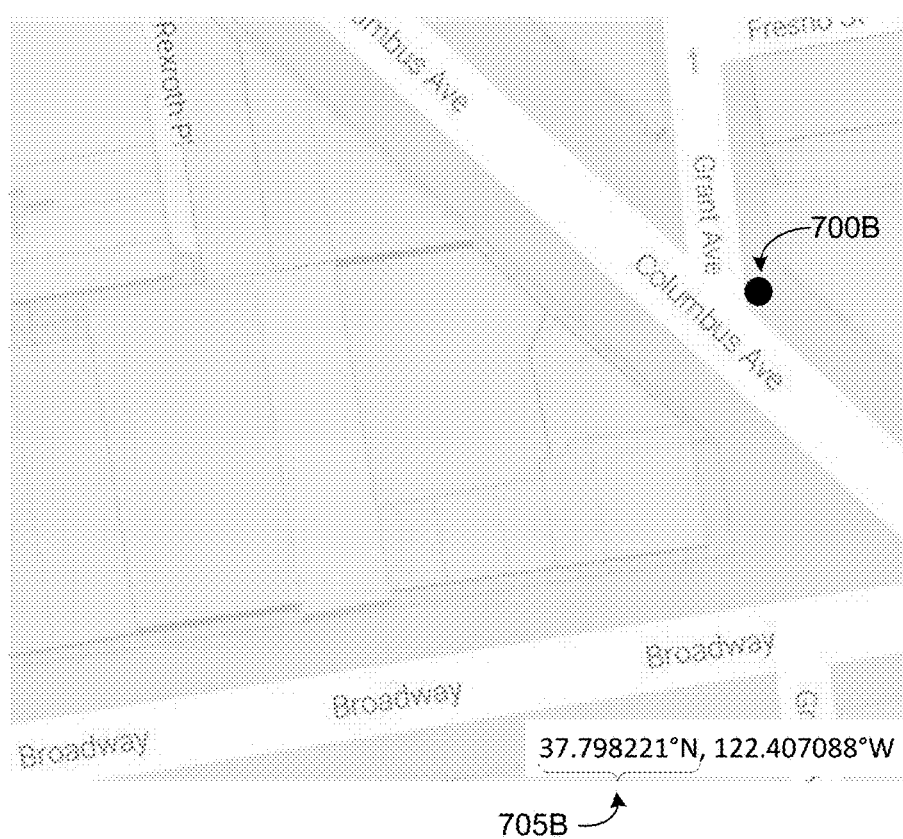
FIG. 7B is an additional example position of a geographic location of a client device associated with an online system user on a map and a location point identifying a position of the geographic location on a specified axis of the map, in accordance with an embodiment.
Figure 8A:
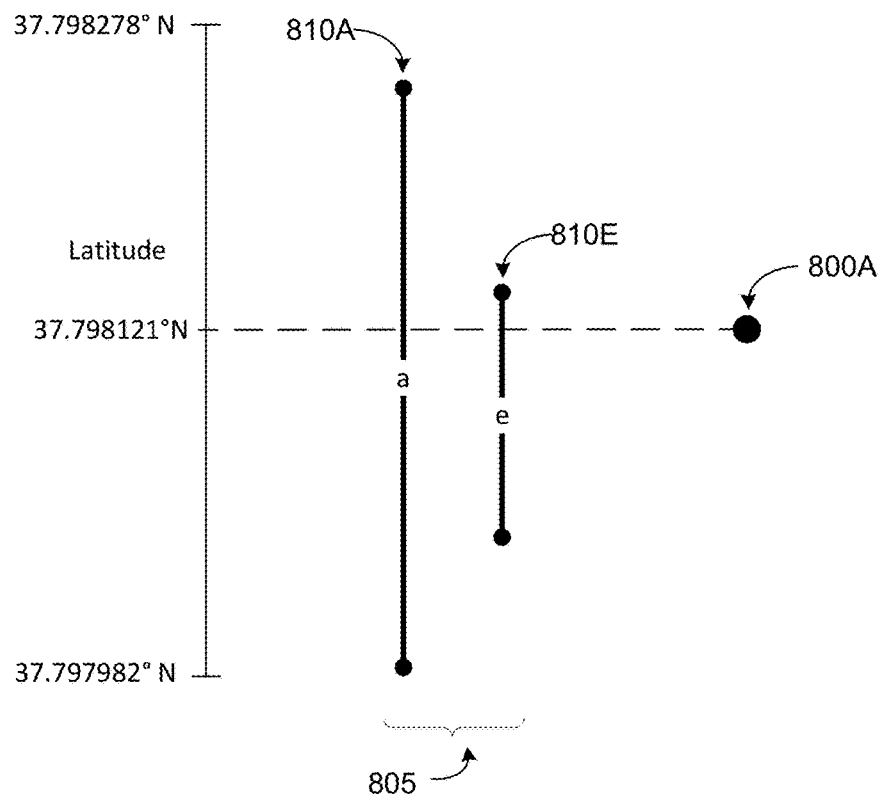
FIG. 8A is an example set of edges of a polygon representing a physical location that span a location point along a specified axis of a map, in accordance with an embodiment.
Figure 8B:
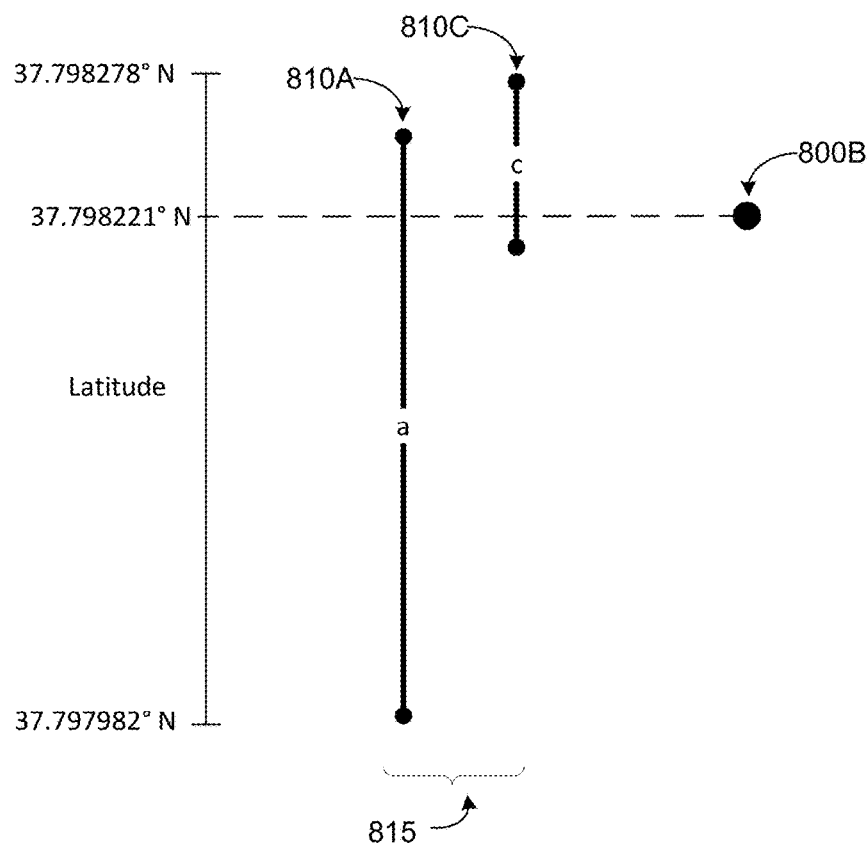
FIG. 8B is an additional example set of edges of a polygon representing a physical location that span a location point along a specified axis of a map, in accordance with an embodiment.

As another example, referring to FIG. 8B, the online system 140 queries the edge data store 250 for a set 815 of edges 810A, C that span a latitude coordinate 705B of 37.798221° N, which identifies a position on the map of the location point 800B determined 335 by the online system 140 in the example of FIG. 7B. In response to the query, edge indexes associated with each edge of the polygon 410 stored 325 in the edge data store 250 are used to identify edges 810A, C having endpoints above and below latitude 37.798221° N. In this example, a set 815 of edges 810A, C including an edge 810A having indexed endpoints at latitude 37.798252° N and 37.797982° N, and an edge 810C having indexed endpoints at latitude 37.798273° N and 37.798199° N is identified and retrieved 340 by the online system 140.

In some embodiments, the set of edges retrieved 340 by the online system 140 may include edges of different polygons. For example, if the online system 140 receives 300 targeting criteria describing different physical locations associated with one or more content items and determines 310 a polygon representing each physical location, the edge data and edge indexes determined 310, 320, generated 315 and stored 325 by the online system 140 include edge coordinates associated with each polygon and the retrieved set of edges includes edges of one or more of each polygon that span the location point along the specified axis of the map. If the set of edges retrieved 340 by the online system 140 includes edges of different polygons, the online system 140 identifies a polygon associated with each edge included in the set of edges based on a polygon identifier stored with the edge data associated with each edge, in various embodiments. Hence, the set of edges spanning the location point may include one or more edges of different polygons.

Referring again to FIG. 3, the online system 140 uses the retrieved set of edges to determine 350 whether the client device 110, and therefore the user of the client device 110, is at the physical location associated with the content item. To determine 350 whether the client device 110 is at the physical location, the online system 140 compares 345 the position of the location point and the position of each edge of the set of edges on an axis of the map perpendicular to the specified axis and computes a value associated with the comparison. For example, if the location point represents a position of the geographic location of the client device 110 on a vertical axis of the map, the online system 140 compares 345 a position of each edge of the set of edges relative to the location point on a horizontal axis of the map and computes a number of edges of the set of edges on one side of the location point along the horizontal axis.

Figure 9A:
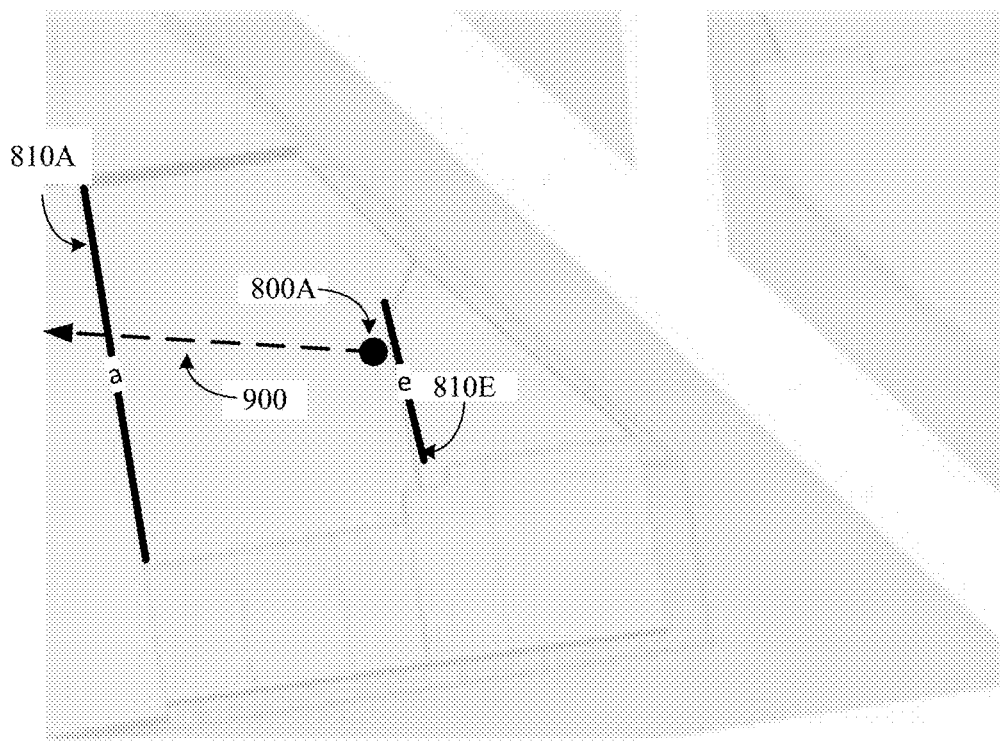
FIG. 9A is an example of a ray from a position of a location point on a map along an axis of the map perpendicular to a specified axis of the map, in accordance with an embodiment.
Figure 9B:
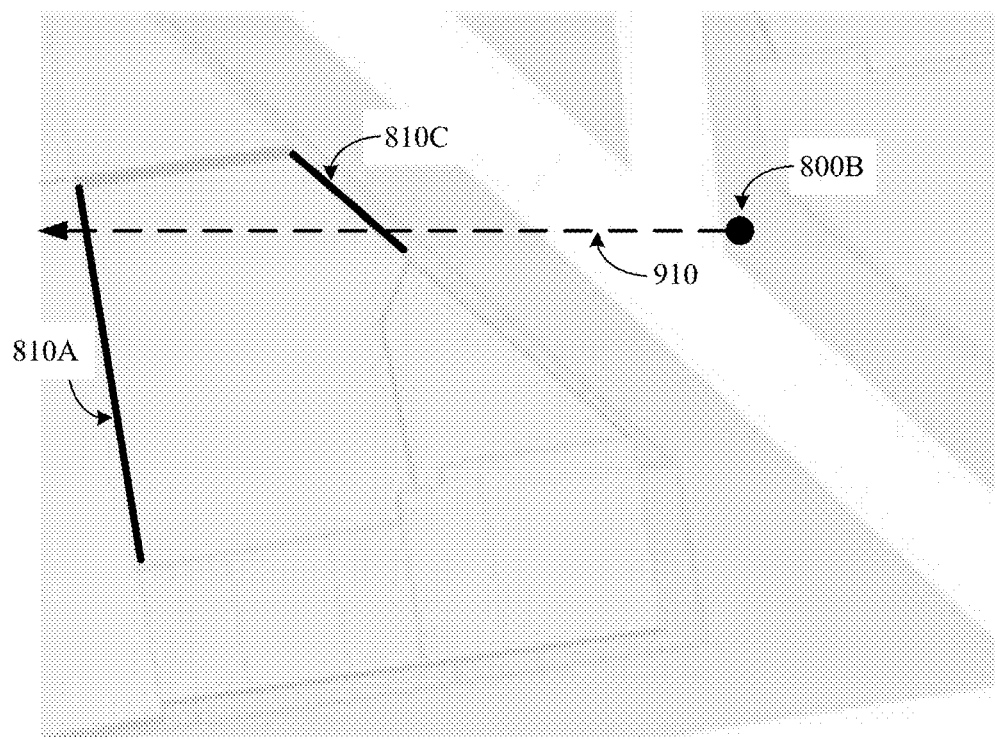
FIG. 9B is an additional example of a ray from a position of a location point on a map along an axis of the map perpendicular to a specified axis of the map, in accordance with an embodiment.
Figure 10A:
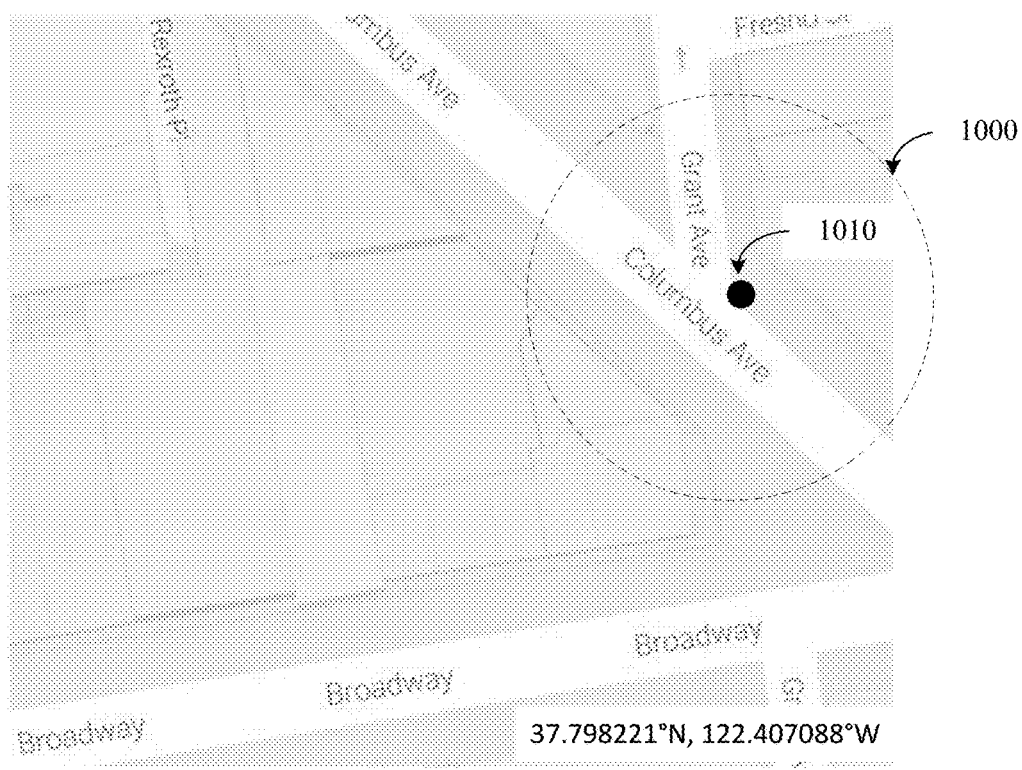
FIG. 10A is an example location boundary surrounding a position of a geographic location of a client device associated with an online system user on a map, in accordance with an embodiment.
Figure 10B:
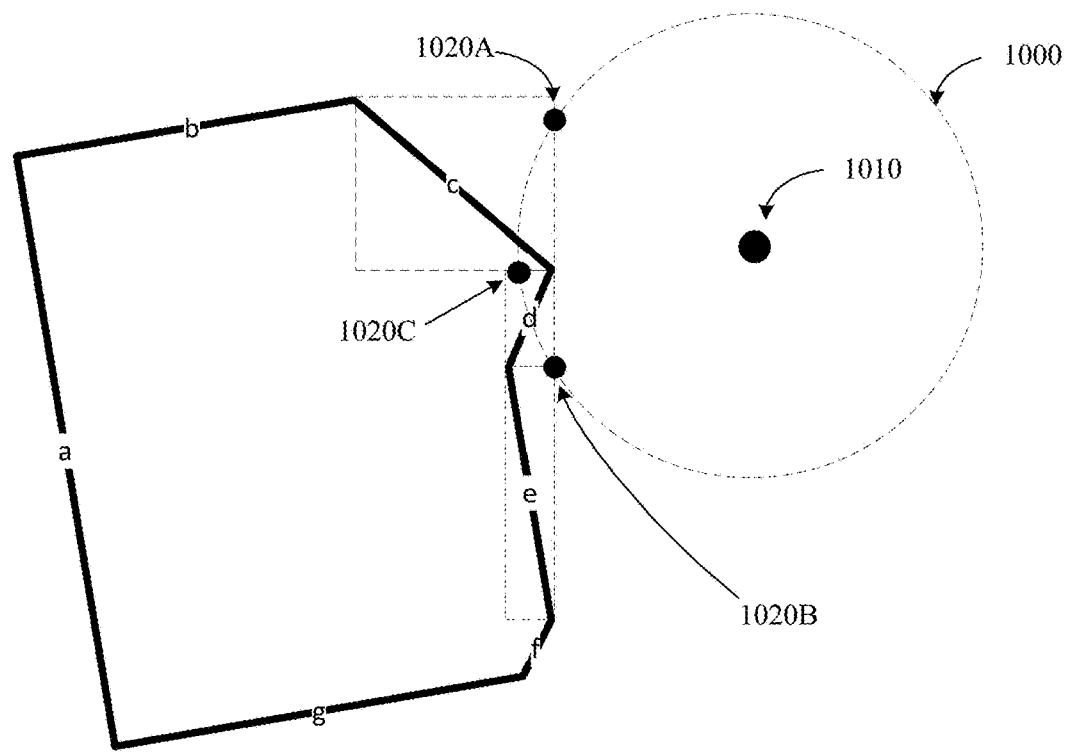
FIG. 10B is an example comparison of a position of a location boundary surrounding a position of a geographic location of a client device associated with an online system user on a map and edge boundaries surrounding edges of a polygon representing a physical location on the map, in accordance with an embodiment.

In some embodiments, the online system 140 performs the comparison by tracing a ray from the position of the location point on the map along an axis of the map perpendicular to the specified axis and computes a value describing a number of edges of the set of edges intersected by the ray. For example, as illustrated in FIG. 9A, since the location point 800A determined in FIG. 7A represents a position of the geographic location of the client device 110 on a vertical axis of the map, the online system 140 traces a ray 900 from the location point 800A along a horizontal axis of the map and computes a number of edges of the set 805 of edges 810A, E intersected by the ray 900. In this example, a ray 900 from the location point 800A along a horizontal axis of the map intersects one edge 810A of the set 805 of edges 810A, E. As an additional example, referring to FIG. 9B, the online system 140 traces a ray 910 from the position of the location point 800B on the map along an axis of the map perpendicular to the specified axis and computes a number of two edges 810A, C of the set 815 of edges 810A, C intersected by the ray 910. If the set of edges includes edges of different polygons, the online system 140 computes a value describing a number of edges of each polygon included in the set of edges intersected by the ray. For example, the online system 140 computes a number of edges associated with each of one or more polygon identifiers associated with the set of edges intersected by the ray.

Based on the computed value associated with the comparison of the position of the location point and the position of each edge of the set of edges, the online system 140 determines whether the client device 110 is within an area of the map represented by the polygon 410. In various embodiments, the online system 140 determines the client device 110 is within an area of the map represented by the polygon 410 if the computed value indicates an odd number of edges of the set of edges are intersected by a ray from a position of the location point along an axis of the map perpendicular to the specified axis. For example, referring again to FIG. 9A, the online system 140 traces a ray 900 from the location point 800A along a horizontal axis of the map and determines the client device 110 is within an area of the map represented by the polygon 410 since one edge 810A of the set 805 of edges 810A, E is intersected by the ray 900. As illustrated in this example, a ray 900 from the location point 800A intersecting an odd number of edges of the polygon 410 along an axis of the map perpendicular to the specified axis indicates the location point 800A is within an area of the map bound by the edges of the polygon 410. If the computed value is associated with a set of edges including edges of more than one polygon, the online system 140 determines the client device 110 is within an area of the map represented by a particular polygon if the value indicates an odd number of edges of the particular polygon are intersected by the ray. For example, the online system 140 identifies a particular polygon having an odd number of edges intersected by the ray based on a polygon identifier associated with the odd number of edges.

If the client device 110 is determined to be within an area of the map represented by the polygon 410, the online system 140 determines 350 the client device 110 is at the physical location and the user associated with the client device 110 is eligible to be presented with a content item associated with the physical location. If the online system 140 determines the user associated with the client device 110 is eligible to be presented with a content item associated with the physical location, the online system 140 provides 355 the content item to the client device 110 for presentation to the user, in various embodiments. For example, the online system 140 identifies the polygon formed by each edge of the set of edges based on a polygon identifier stored in association with edge data describing each edge of the set of edges and communicates a stored content item associated with the physical location represented by the polygon to the client device 110 for presentation to the user. In other embodiments, if the online system 140 determines the user associated with the client device 110 is eligible to be presented with a content item associated with the physical location, the content item is included in a content selection process and ranked among other content items associated with targeting criteria satisfied by the user; the content item is provided 255 to the client device 110 for presentation to the user if the content item is selected during the content selection process, as further described above in conjunction with FIG. 2.

In various embodiments, the online system 140 determines the client device 110 is not within an area of the map represented by the polygon 410 if the value computed by the online system 140 indicates no edge or an even number of edges of the set of edges is intersected by a ray from a position of the location point along an axis of the map perpendicular to the specified axis. For example, referring to FIG. 9B, the online system 140 traces a ray 910 from the location point 800B along an axis of the map perpendicular to the specified axis and determines the client device 110 is not within an area of the map represented by the polygon 410 since two edges of the set 815 of edges 810A, C are intersected by the ray 910. As illustrated in this example, a ray 910 from the location point 800B intersecting an even number of edges of the polygon 410 along an axis of the map perpendicular to the specified axis indicates the location point 800B is outside an area of the map bound by the edges of the polygon 410. If the computed value is associated with a set of edges including edges of more than one polygon, the online system 140 determines the client device 110 is not within an area of the map represented by a particular polygon if the value indicates no edges or an even number of edges of the particular polygon are intersected by the ray, in some embodiments. For example, the online system 140 identifies a particular polygon having an even number of edges intersected by the ray based on a polygon identifier associated with the even number of edges.

If the client device 110 is determined to be not within an area of the map represented by the polygon 410, the online system 140 determines 350 the client device 110 is not at the physical location. The online system 140 then determines 370 whether the client device 110 is within at least a threshold distance of the physical location. In various embodiments, the threshold distance is specified by a publishing user who provided the online system 140 with the content item and information describing the physical location. For example, if the online system 140 receives 300 targeting criteria associated with the content item specifying online system users determined to be within 100 yards from the physical location are eligible to receive the content item, the threshold distance is 100 yards.

To determine 370 whether the client device 110 is within at least the threshold distance of the physical location, the online system 140 determines 360 a location boundary surrounding a representation of the geographic location of the client device 110 on the map and compares the position of the location boundary and a position of an edge boundary surrounding each edge of the polygon 410 on the map. In various embodiments, the location boundary comprises a radius around a representation of the geographic location of the client device 110 on the map corresponding to the threshold distance. For example, referring to FIG. 10A, if the threshold distance is 50 meters, the online system 140 determines 360 a location boundary 1000 associated with the geographic location of the client device that includes a geographic area having a radius of 50 meters around a representation 1010 of the geographic location of the client device 110 on the map. In some embodiments, the location boundary 1000 comprises a set of location boundary coordinates which identifies a plurality of points along a geometric perimeter surrounding a representation 1010 of the geographic location of the client device 110 on the map. For example, to determine 360 the location boundary 1000, the online system 140 determines 360 a set of location boundary coordinates identifying multiple points on the map comprising a radius around a representation 1010 of the geographic location of the client device 110 on the map corresponding to the threshold distance.

In various embodiments, the online system 140 compares 365 the position of the location boundary and a position of an edge boundary surrounding each edge of the polygon 410 on the map to determine whether the location boundary intersects at least one edge boundary. For example, the online system 140 queries the edge data store 250 for edge boundary coordinates stored in association with each edge of the polygon 410 and determines whether the location boundary intersects at least one edge boundary based on the returned edge boundary coordinates. The online system 140 determines the location boundary intersects an edge boundary if a set of location boundary coordinates comprising the location boundary identify a point on the map also identified by a set of edge boundary coordinates comprising edge boundaries determined 320 by the online system 140, in some embodiments. For example, referring to FIG. 10B, if both the location boundary 1000 and an edge boundary include a point 1020A-C on the map identified by the same x,y coordinate, the online system 140 determines the location boundary 1000B intersects the edge boundary. In this example, the online system 140 determines the location boundary 1000B intersects three edge boundaries at three points 1020A-C on the map.

In various embodiments, if the online system 140 determines the location boundary intersects at least one edge boundary, the client device 110 is determined 370 to be within at least the threshold distance of the physical location associated with the content item. For example, referring again to FIG. 10B, the online system 140 determines 370 the client device 110 is within at least the threshold distance of the physical location 1010 since the location boundary 1000 intersects at least one edge boundary. Hence, based on the comparison of the position of the location boundary 1000 and edge boundaries surrounding edges of the polygon 410, the online system 140 determines 370 whether the client device 110 is within at least the threshold distance of the physical location.

If the client device 110 is determined 370 to be within the threshold distance of the physical location, the online system 140 determines the user associated with the client device 110 is visiting an area within the threshold distance of the physical location and is therefore eligible to be presented with a content item associated with the physical location. If the online system 140 determines the user associated with the client device 110 is eligible to be presented with a content item associated with the physical location, the online system 110 provides 355 the content item to the client device 110 for presentation to the user, in various embodiments. For example, the online system 140 identifies a polygon formed by an edge circumscribed by an edge boundary intersecting the location boundary and communicates a content item associated with the physical location represented by the polygon to the client device 110 for presentation to the user. In this example, the online system 140 identifies the polygon 410 based on a polygon identifier stored in association with the edge boundary and retrieves a stored content item associated with the physical location for presentation.

In other embodiments, if the online system 140 determines the user associated with the client device is eligible to be presented with a content item associated with the physical location, the content item is included in a content selection process and ranked among other content items associated with targeting criteria satisfied by the user. As further described above in conjunction with FIG. 2, the content item is provided 355 to the client device 110 for presentation to the user if the content item is selected during the content selection process. Hence, the online system 140 determines whether the user is eligible to receive the content item when the user is at or within the specified distance of the physical location based on the stored information describing the polygon 410 representing the physical location and the location information received 330 from the user's client device 110.

SUMMARY

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a nontransitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
  determining a polygon having a plurality of edges bounding a representation of a physical location on a map, the physical location associated with a content item maintained by an online system;
  for each edge of the plurality of edges,
    determining edge data describing a position of the edge on the map, the edge data comprising a plurality of edge coordinates representing a plurality of points of the edge on the map,
    generating an index comprising a set of edge coordinates representing a position of each endpoint of the edge along a specified axis of the map, and
    storing the edge data and index into an edge data store with an identifier associated with the polygon;
  receiving, from a client device associated with a user of the online system, location information describing a geographic location of the client device;
  determining a location point representing a position of the geographic location on the specified axis of the map based on the location information;
  determining which of the plurality of edges of the polygon to retrieve, where each edge is determined to be retrieved when the edge spans the location point along the specified axis of the map;

retrieving, from the edge data store, edge data associated with each of the edges of the polygon that were determined to be retrieved;

determining whether the client device is at the physical location based at least in part on the retrieved edge data; and responsive to determining the client device is at the physical location, providing the content item to the client device for presentation to the user.

2. The method of claim 1, wherein querying the edge data store using a set of indexed edge coordinates comprises identifying an edge associated with a plurality of edge coordinates representing a position of each endpoint of the edge on opposite sides of the location point along the specified axis of the map.

3. The method of claim 1, wherein determining whether the client device is at the physical location based at least in part on the retrieved edge data comprises:

comparing a position of the location point on an additional axis of the map perpendicular to the specified axis and a position of each edge of the retrieved edge data on the additional axis of the map; and determining the client device is at the physical location if an odd number of edges of the retrieved edge data includes a point on one side of the location point on the additional axis of the map perpendicular to the specified axis.

4. The method of claim 1, further comprising:

computing a number of edges of the retrieved edge data intersected by a ray from a position of the geographic location on the map along an axis of the map perpendicular to the specified axis; and determining the client device is at the physical location if an odd number of edges of the retrieved edge data are intersected by the ray.

5. The method of claim 4, further comprising determining the client device is not at the physical location if an even number of edges of the retrieved edge data are intersected by the ray or no edge of the retrieved edge data is intersected by the ray.

6. The method of claim 1, further comprising:

responsive to determining the client device is not at the physical location, determining whether the client device is within at least a threshold distance of the physical location based at least in part on a proximity of a representation of the geographic location on the map to an edge of the plurality of edges; and responsive to determining the client device is within at least the threshold distance of the physical location, providing the content item to the client device for presentation to the user.

7. The method of claim 6, wherein determining whether the client device is within at least the threshold distance of the physical location comprises:

determining a location boundary surrounding the representation of the geographic location on the map, the location boundary comprising an area on the map corresponding to a geographic area having a specified radius around the geographic location;

determining whether the location boundary intersects an edge boundary on the map; and responsive to determining the location boundary intersects the edge boundary, determining the client device is within at least the threshold distance of the physical location.

8. The method of claim 1, wherein the physical location is selected from a group consisting of: a building, a street address, a set of geographic coordinates, a neighborhood, a landmark, and any combination thereof.

9. A method comprising:

receiving, from a client device associated with a user of an online system, location information describing a geographic location of the client device;

determining a location point representing a position of the geographic location on a specified axis of the map based on the location information;

determining which of a plurality of edges of one or more polygons to retrieve, the one or more polygons representing one or more physical locations on the map, where each edge is determined to be retrieved when the edge spans the location point along the specified axis of the map;

retrieving stored edge data associated with each of the edges of the one or more polygons that were determined to be retrieved;

computing a value associated with the retrieved edge data based at least in part on a number of edges of the retrieved edge data associated with a polygon of the one or more polygons; and determining whether the client device is at a physical location represented by the polygon based at least in part on the value associated with the retrieved edge data.

10. The method of claim 9, further comprising responsive to determining the client device is at the physical location, providing a content item associated with the physical location to the client device for presentation to the user.

11. The method of claim 9, further comprising determining the client device is at the physical location if a ray from a position of the geographic location on the map along an axis perpendicular to the specified axis of the map intersects an odd number of edges of the retrieved edge data of the polygon on the map.

12. The method of claim 9, further comprising determining the client device is not at the physical location if a ray from a position of the geographic location on the map along an axis perpendicular to the specified axis of the map intersects an even number of edges of the retrieved edge data of the polygon on the map.

13. The method of claim 9, further comprising determining the client device is not at the physical location if a ray from a position of the geographic location on the map along an axis perpendicular to the specified axis of the map does not intersect an edge of the retrieved edge data of the polygon on the map.

14. The method of claim 9, further comprising:

responsive to determining the client device is not at the physical location, determining whether the client device is within at least a threshold distance of the physical location based at least in part on a proximity of a representation of the geographic location on the map to an edge of retrieved edge data of the polygon; and responsive to determining the client device is within at least the threshold distance of the physical location, providing a content item associated with the physical location to the client device for presentation to the user.

15. The method of claim 14, wherein determining whether the client device is within at least the threshold distance of the physical location comprises:

determining a location boundary surrounding a representation of the geographic location on the map, the location boundary comprising an area on the map corresponding to a geographic area having a specified radius around the geographic location;

determining whether the location boundary intersects an edge boundary of an edge of retrieved edge data of the polygon on the map; and responsive to determining the location boundary intersects the edge boundary, determining the client device is within at least the threshold distance of the physical location.

16. A computer program product comprising a computer readable storage medium having instructions encoded thereon that, when executed by a processor, cause the processor to;

determine a polygon having a plurality of edges bounding a representation of a physical location on a map, the physical location associated with a content item maintained by an online system;

for each edge of the plurality of edges, determine edge data describing a position of the edge on the map, the edge data comprising a plurality of edge coordinates representing a plurality of points of the edge on the map, generate an index comprising a set of edge coordinates representing a position of each endpoint of the edge along a specified axis of the map, and store the edge data and index into an edge data store with an identifier associated with the polygon;

receive, from a client device associated with a user of the online system, location information describing a geographic location of the client device;

determine a location point representing a position of the geographic location on the specified axis of the map based on the location information;

determining which of the plurality of edges of the polygon to retrieve, where each edge is determined to be retrieved when the edge spans the location point along the specified axis of the map;

retrieve, from the edge data store, edge data associated with each of the edges of the polygon that were determined to be retrieved;

determine whether the client device is at the physical location based at least in part on the retrieved edge data; and responsive to determining the client device is at the physical location, provide the content item to the client device for presentation to the user.

17. The computer program product of claim 16, wherein querying the edge data store using a set of indexed edge coordinates comprises identifying an edge associated with a plurality of edge coordinates representing a position of each endpoint of the edge on opposite sides of the location point along the specified axis of the map.

18. The computer program product of claim 16, wherein determine whether the client device is at the physical location based at least in part on the retrieved edge data comprises:

compare a position of the location point on an additional axis of the map perpendicular to the specified axis and a position of each edge of the retrieved edge data on the additional axis of the map; and determine the client device is at the physical location if an odd number of edges of the retrieved edge data includes a point on one side of the location point on the additional axis of the map perpendicular to the specified axis.

19. The computer program product of claim 16, wherein the computer readable storage medium further has instructions encoded thereon that, when executed by the processor, cause the processor to:

compute a number of edges of the retrieved edge data intersected by a ray from a position of the geographic location on the map along an axis of the map perpendicular to the specified axis; and determine the client device is at the physical location if an odd number of edges of the retrieved edge data are intersected by the ray.

20. The computer program product of claim 19, wherein the computer readable storage medium further has instructions encoded thereon that, when executed by the processor, cause the processor to determine the client device is not at the physical location if an even number of edges of the retrieved edge data are intersected by the ray or no edge of the retrieved edge data is intersected by the ray.

21. The computer program product of claim 16, wherein the computer readable storage medium further has instructions encoded thereon that, when executed by the processor, cause the processor to:

responsive to determining the client device is not at the physical location, determine whether the client device is within at least a threshold distance of the physical location based at least in part on a proximity of a representation of the geographic location on the map to an edge of the plurality of edges; and responsive to determining the client device is within at least the threshold distance of the physical location, provide the content item to the client device for presentation to the user.

22. The computer program product of claim 21, wherein determine whether the client device is within at least the threshold distance of the physical location comprises:

determine a location boundary surrounding the representation of the geographic location on the map, the location boundary comprising an area on the map corresponding to a geographic area having a specified radius around the geographic location;

determine whether the location boundary intersects an edge boundary on the map; and responsive to determining the location boundary intersects the edge boundary, determine the client device is within at least the threshold distance of the physical location.

23. The computer program product of claim 16, wherein the physical location is selected from a group consisting of: a building, a street address, a set of geographic coordinates, a neighborhood, a landmark, and any combination thereof.

* * * * *